US012709909B2

(12) United States Patent
Spicer et al.

(10) Patent No.: US 12,709,909 B2

(45) Date of Patent: Aug. 18, 2026

(54) SPA COVER LIFT SYSTEM

(71) Applicant: Strong Industries, Inc., Northumberland, PA (US)

(72) Inventors: Wade Spicer, Northumberland, PA (US); Charles Woods, West Manchester, OH (US)

(73) Assignee: Strong Industries, Inc., Northumberland, PA (US)

(*) Notice: Subject to any disclaimer, the term of this patent is extended or adjusted under 35 U.S.C. 154(b) by 238 days.

(21) Appl. No.: 18/507,192

(22) Filed: Nov. 13, 2023

(65) Prior Publication Data

US 2024/0159070 A1 May 16, 2024

Related U.S. Application Data

(60) Provisional application No. 63/424,990, filed on Nov. 14, 2022.

(51) Int. Cl.
*E04H 4/08* (2006.01)
*E05F 1/14* (2006.01)

(52) U.S. Cl.
CPC ............... *E04H 4/084* (2013.01); *E05F 1/14* (2013.01)

(58) Field of Classification Search
CPC .................................. E04H 4/084; E05F 1/14
USPC ............................................................ 4/198
See application file for complete search history.

(56) References Cited

U.S. PATENT DOCUMENTS

| | | | | |
|---|---|---|---|---|
| 9,181,721 | B2 | 11/2015 | Spicer | |
| 9,845,607 | B2 | 12/2017 | Spicer | |
| 10,273,702 | B1 * | 4/2019 | Cunerty | A61H 33/6005 |
| 10,487,523 | B2 | 11/2019 | Spicer et al. | |
| 10,526,807 | B2 | 1/2020 | Spicer et al. | |
| 11,359,396 | B2 | 6/2022 | Spicer et al. | |
| 11,808,050 | B2 * | 11/2023 | Spicer | E05F 1/14 |
| 12,203,286 | B2 * | 1/2025 | Fisher | E04H 4/084 |
| 2022/0268043 | A1 | 8/2022 | Spicer et al. | |

* cited by examiner

*Primary Examiner* — Jennifer C Chiang

(74) *Attorney, Agent, or Firm* — Grogan, Tuccillo & Vanderleeden LLP

(57) ABSTRACT

A lift system for a spa cover includes a first lifter arm connected to a spa cover adjacent to a first end, and rotatably connected to a housing of a spa at a second end, a plate connected to the first lifter arm and rotatable with the first lifter arm, a linkage having a first end connected to the plate adjacent to a periphery of the plate, and a second end, and a linear actuator moveable between a retracted position and an extended position, a distal end of the linear actuator being connected to the second end of the linkage. Movement of the linear actuator from the retracted position to the extended position effects rotation of the plate and first lifter arm.

18 Claims, 35 Drawing Sheets

SPA COVER LIFT SYSTEM

CROSS-REFERENCE TO RELATED APPLICATIONS

This application claims the benefit of U.S. Provisional Application Ser. No. 63/424,990, filed on Nov. 14, 2022, which is hereby incorporated by reference herein in its entirety.

FIELD OF THE INVENTION

The present invention relates generally to spas and hot tubs and, more particularly, to a hot tub or spa cover lift system.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage like effect.

Because many spas/hot tubs are located outdoors, they are often equipped with covers for enclosing the tub when not in use. These covers help prevent dirt, leaves and other debris from entering the water, and provide a safety function by preventing children and animals from falling into the water. Moreover, spa covers are often insulated so as to limit heat loss from the water when the spa is not in use, for purposes of energy efficiency and readiness of use.

Both soft and hard covers are known in the art. Typical hard covers generally consist of a hollow plastic shell that can be filled with an insulating foam. Typical hard covers may be formed using a variety of molding methods, such as through rotational molding and blow molding, as well as vacuum forming. These hard covers, and even some soft covers, typically require some sort of lift mechanism to remove them from the spa. Many existing lift mechanisms are outfitted to the external cabinet or base of the spa, and can be cumbersome to operate, are unsightly, and contain a number of exposed components that can impede free movement around the spa.

In view of the above, there remains a need for a cover lifter system for a spa that has improved performance properties, repeatability, structural integrity, and ease of use.

SUMMARY OF THE INVENTION

It is an object of the present invention to provide a spa cover lift system.

It is another object of the present invention to provide an automated spa cover lift system.

It is another object of the present invention to provide a spa cover lift system that allows for both manual and automated operation.

These and other objects are achieved by the present invention.

According to an embodiment of the present invention, a lift system for a spa cover includes a first lifter arm connected to a spa cover adjacent to a first end, and rotatably connected to a housing of a spa at a second end, a plate connected to the first lifter arm and rotatable with the first lifter arm, a linkage having a first end connected to the plate adjacent to a periphery of the plate, and a second end, and a linear actuator moveable between a retracted position and an extended position, a distal end of the linear actuator being connected to the second end of the linkage. Movement of the linear actuator from the retracted position to the extended position effects rotation of the plate and first lifter arm.

According to another embodiment of the present invention, a lift system for a spa cover includes a first lifter arm connected to a spa cover adjacent to a first end of the first lifter arm, and rotatably connected to a housing of a spa at a first pivot point, and a motorized lift device operatively connected to the first lifter arm and configured to move the spa cover between a covered position and an uncovered position. The spa cover is moveable between the covered position and the uncovered position automatically under bias from the motorized lift device, and manually via manual rotation of the first lifter arm about the first pivot point.

According to yet another embodiment of the present invention, a method for operating a spa cover includes the steps of, in an automatic mode of operation, actuating a motor of a linear actuator to automatically move a spa cover between a covered position and an uncovered position, and in a manual mode of operation, manually rotating a lifter arm to move the spa cover between the covered position and the uncovered position, wherein manually rotating the lifter arm effects decoupling of the linear actuator from an uncovering and covering cycle of the spa cover.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
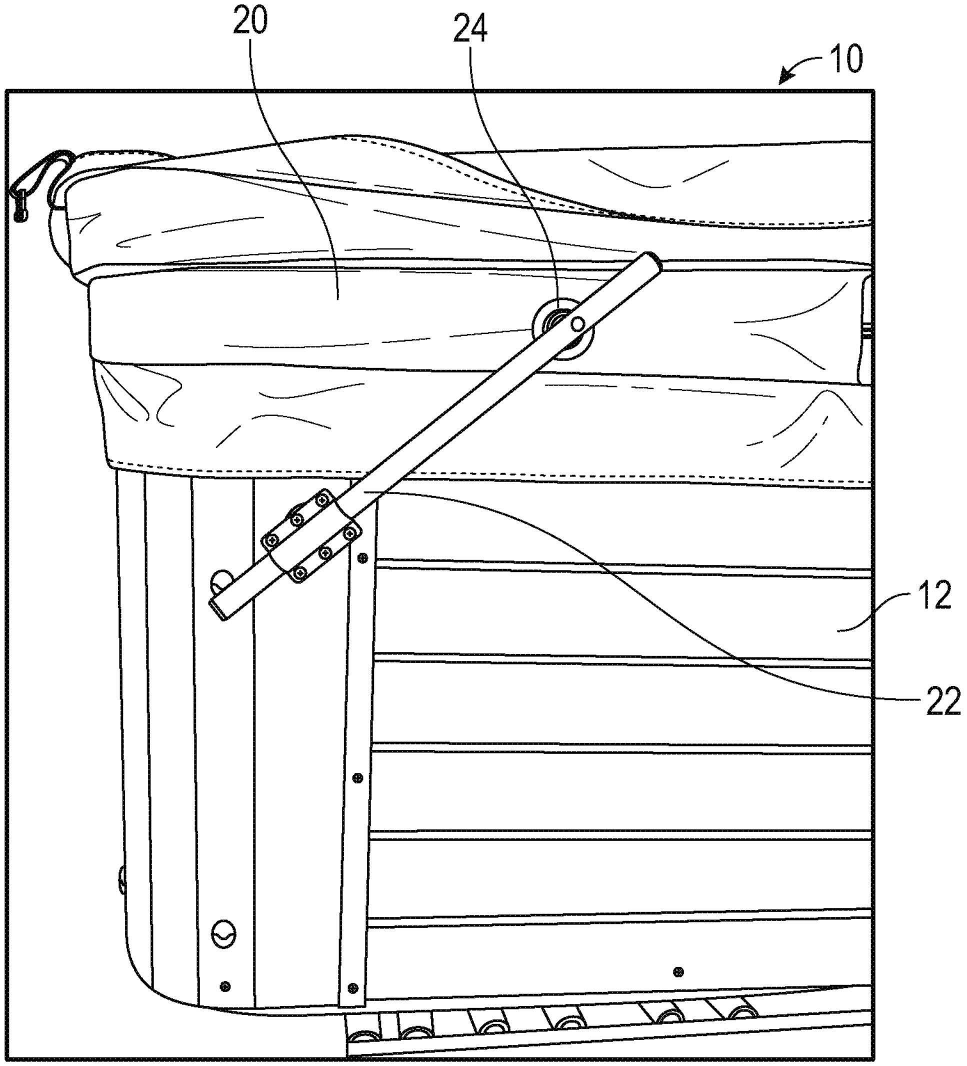
FIG. 1 is a perspective view of a spa having a cover lift system, according to an embodiment of the invention.
Figure 2:
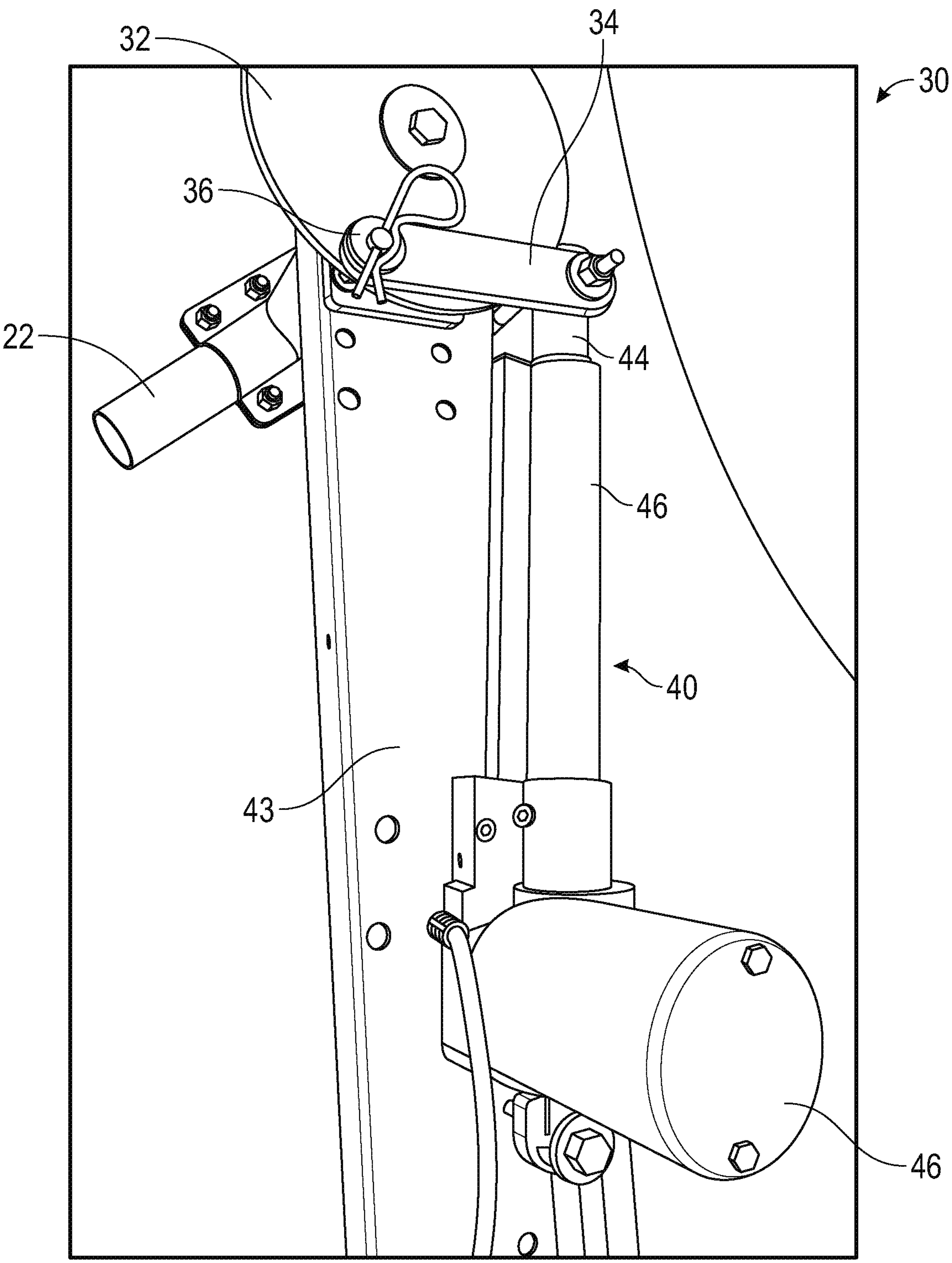
FIGS. 2-29 illustrate a motorized cover lift system according to an embodiment of the present invention, and operation thereof.
Figure 3:
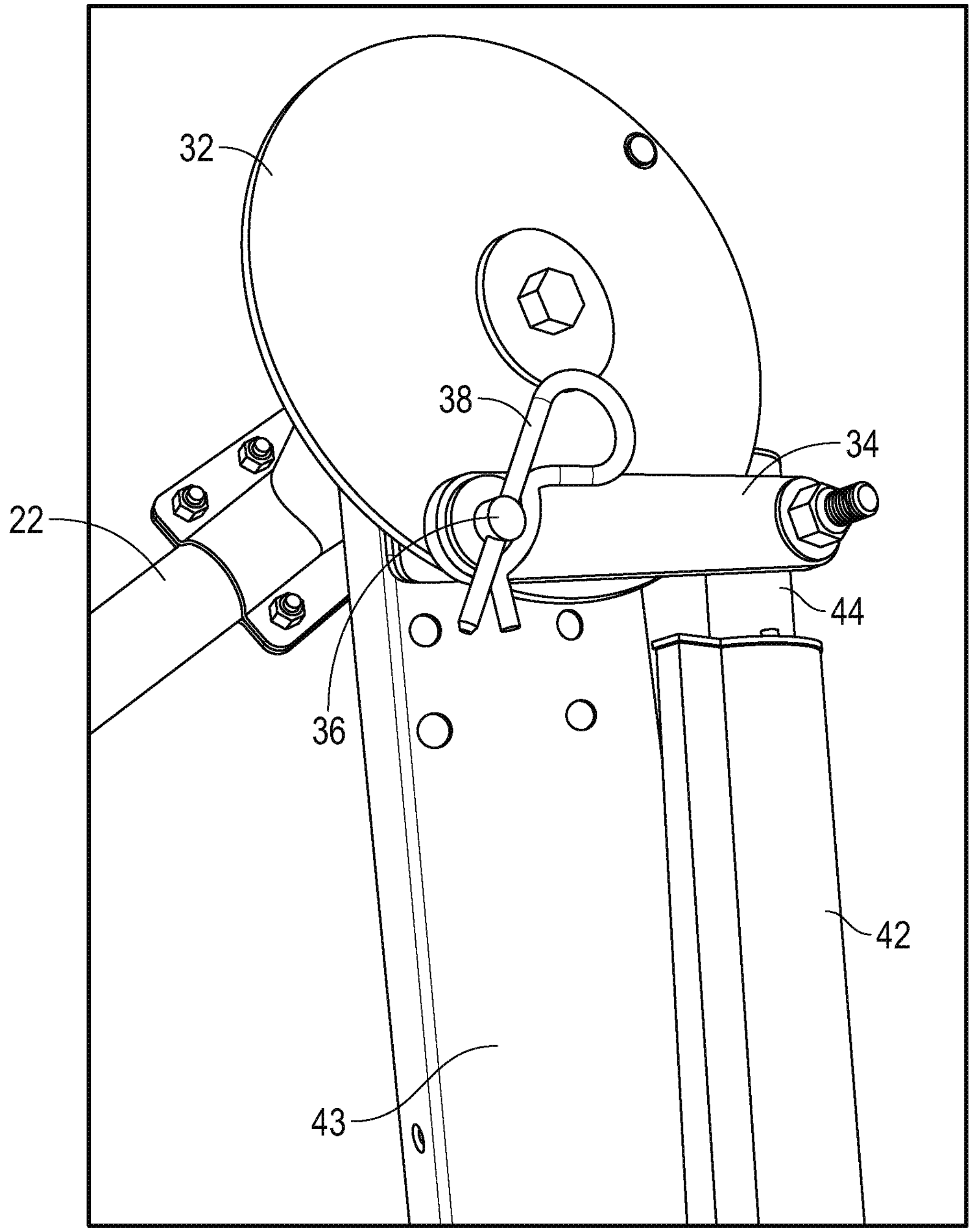
Figure 4:
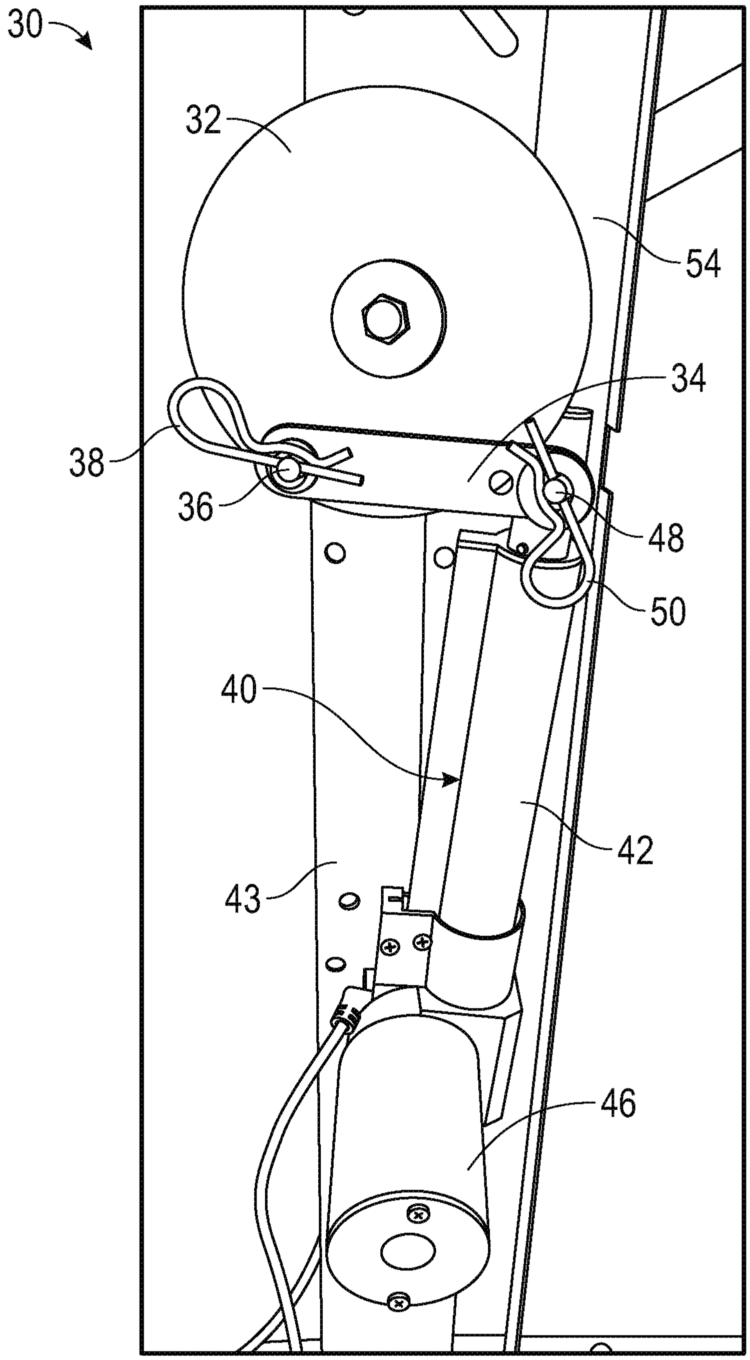
Figure 5:
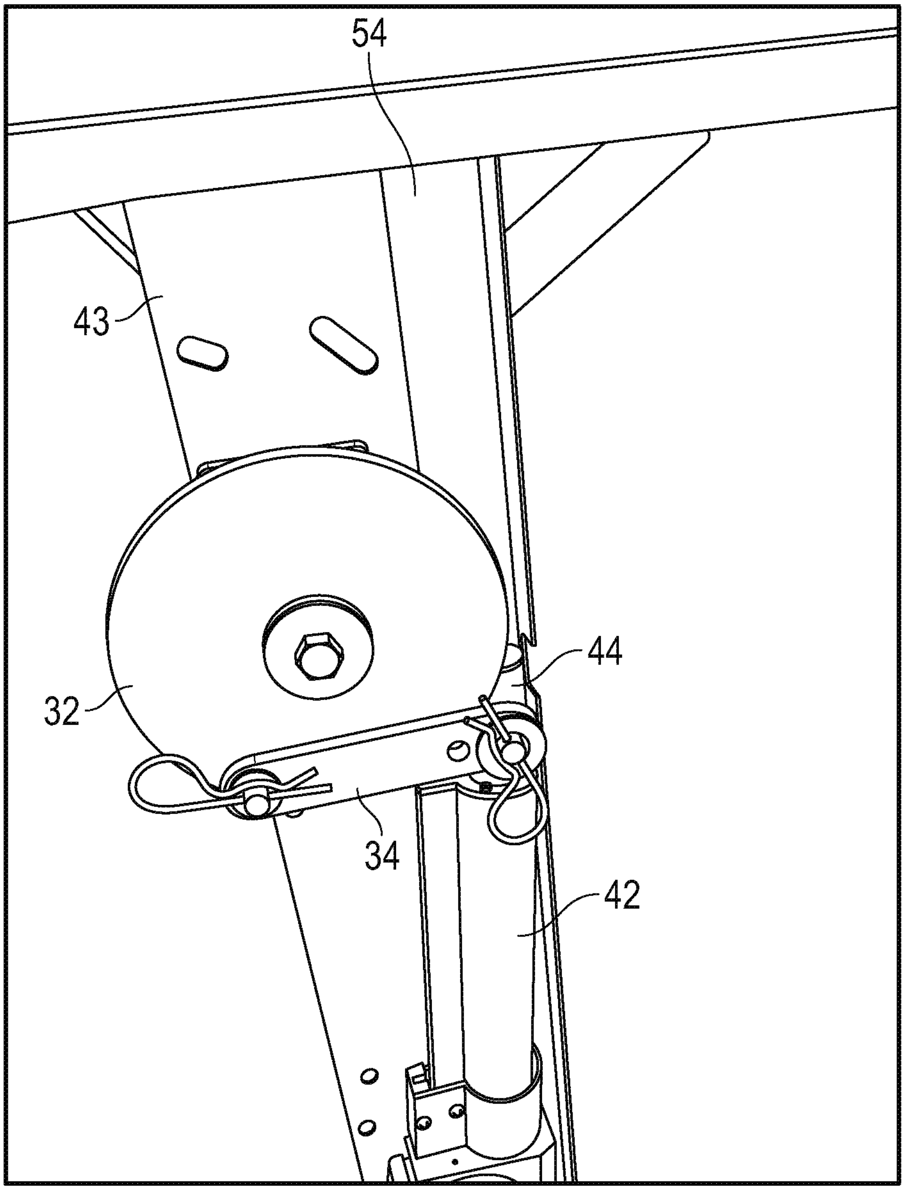

Referring to FIGS. 1, a spa 10, also referred to as a hot tub, having a cover lift system according to an embodiment of the present invention is shown. The spa 10 includes a cabinet or housing 12 within which is supported a shell (not shown) for containing a volume of water. The shell is preferably contoured to provide seating for user occupants of spa 10 and includes one or more jets which extend through shell for injecting air and water into the water within the shell, as is known in the art.

The housing may be configured to provide any suitable interior chamber and includes an open upper end for user entry and exit. In an embodiment, the housing defines a square or rectangular footprint. In other embodiments, the housing may define a circular, triangular or other regular or irregularly shaped footprint.

The spa 10 includes a cover member 20 which is positionable over the open upper end of the housing 12 for covering at least a portion of the open upper end. In an embodiment the cover member 20 is a single cover configured to enclose the entire open upper end, and which is foldable about a midline. In other embodiments, the cover member 20 includes a pair of cover member halves, each of which is sized to cover one half of the open upper end of the spa 10. The cover member is movable between a closed or covered position, in which the cover 20 rests on the open upper end to substantially or entirely enclose the open upper end of the spa 10, and an open or uncovered position in which the cover 20 is displaced from the open upper end to provide user access to the interior chamber through upper end.

With further reference to FIG. 1, in an embodiment, the spa 10 includes opposed lifter arms 22, 23, one on each side of the housing 12 (although only one is illustrated in FIG. 1). The lifter arms 22, 23 are interconnected with one another adjacent their upper, distal ends via a crossbar 24 that extends horizontally through the cover 20. In an embodiment, the spa cover 20 is able to pivot about the crossbar 24. The lifter arms 22, 23 each include a shaft 26 at their lower, proximal ends that extends through opposing sides of the housing 12 such that the lifter arms 22, 23, and thus the cover 20, are pivotally connected to the housing 12 via the shafts 26. As is known in the art, the cover 20 can be moved between the covered and uncovered positions by rotating the lifter arms 22, 23 about an axis extending though the shafts 26.

Referring now to FIGS. 2-18, a lift system 30 for the spa cover 20 according to an embodiment of the present invention is illustrated. As shown therein, the lift system 30 includes, at one side of the housing 12, a plate or disk 32 rigidly connected to the end of the shaft 26 that extends through the side of the housing 12, such that rotation of the lever arm 22 imparts a corresponding rotation of the shaft 26 and disk 32. In an embodiment, the axis of rotation of the shaft 26 passes through the center of the disk 32. The lift system 30 further includes a linkage 34 pivotally connected at a first end thereof to the disk 32 adjacent to an outer periphery of the disk 32, and which extends parallel to a plane of the disk 32. In an embodiment, the first end of the linkage 34 receives therethrough a pin 36 mounted to the disk 32, which defines a pivot point about which the linkage 34 is able to rotate. The linkage 34 is held in place on the pin 36 via a cotter pin 38 or the like, although other connection means known in the art may also be utilized. The pivot point of the linkage 34 with respect to the disk 32 is thus offset from the axis of rotation of the shaft 26 and disk 32.

As further shown therein, the lift system 30 further includes a linear actuator 40 mounted at one end to a structural member or support member 43 of the housing 12/frame, and at an opposing end to the second end of the linkage 34. The linear actuator 40 may be any type of linear actuator known in the art, such as hydraulic, electro-mechanical or pneumatic. In an embodiment, the linear actuator 40 is an electro-mechanical actuator and includes a housing or guide cylinder 42 that slidably receives a piston rod 44. The piston rod 44 is extendable and retractable under control of an electric motor 46, as is known in the art. In an embodiment, the distal end of the piston rod 44 is pivotally connected to the second end of the linkage 34. For example, the piston rod 44 and linkage 34 may be pivotally connected via a shaft 48 that extends through the linkage 34 and piston rod 44. The shaft may be held in place be a cotter pin 50 or the like, although other connection means known in the art may also be utilized.

Figure 6:
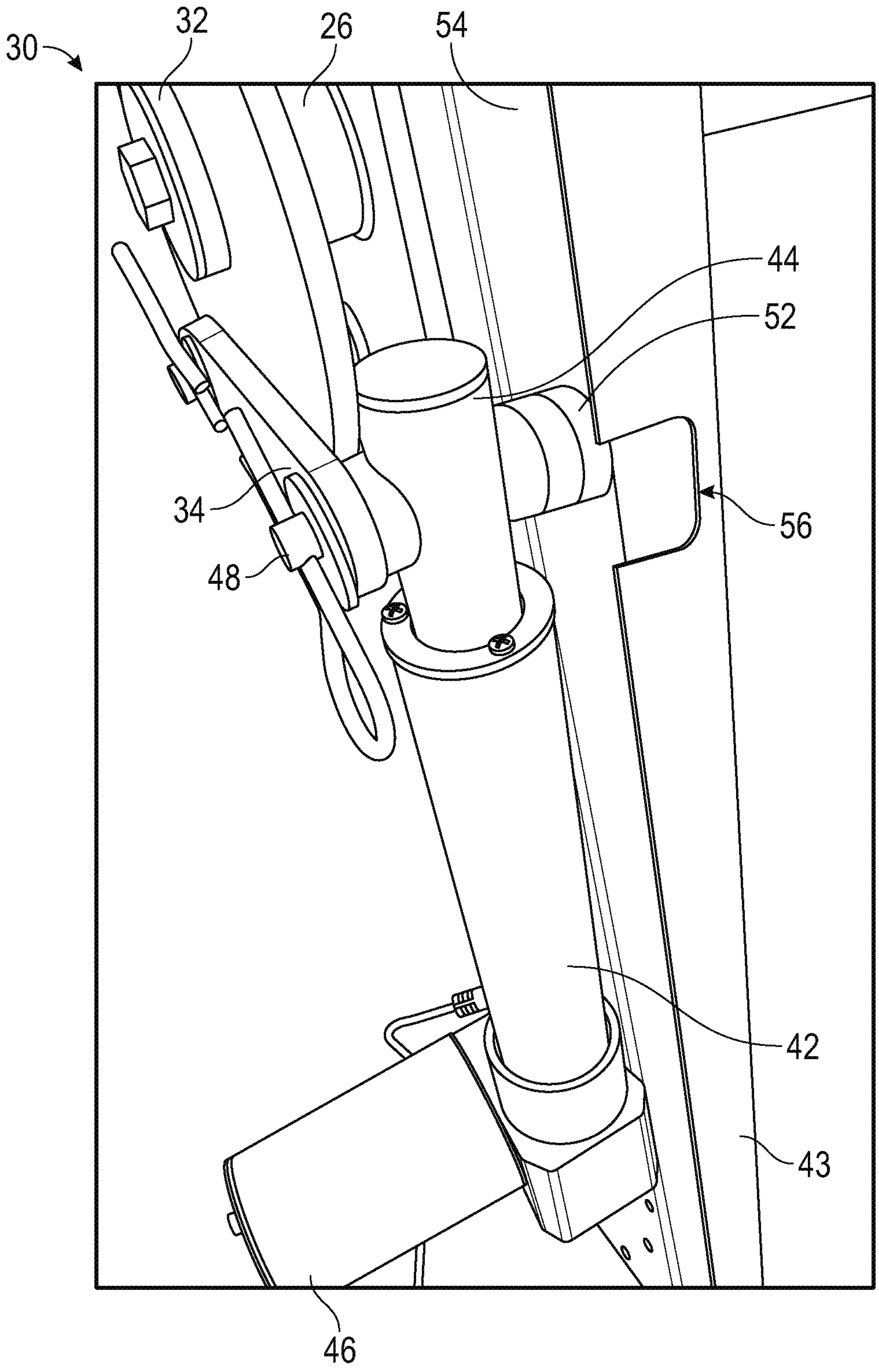
Figure 7:
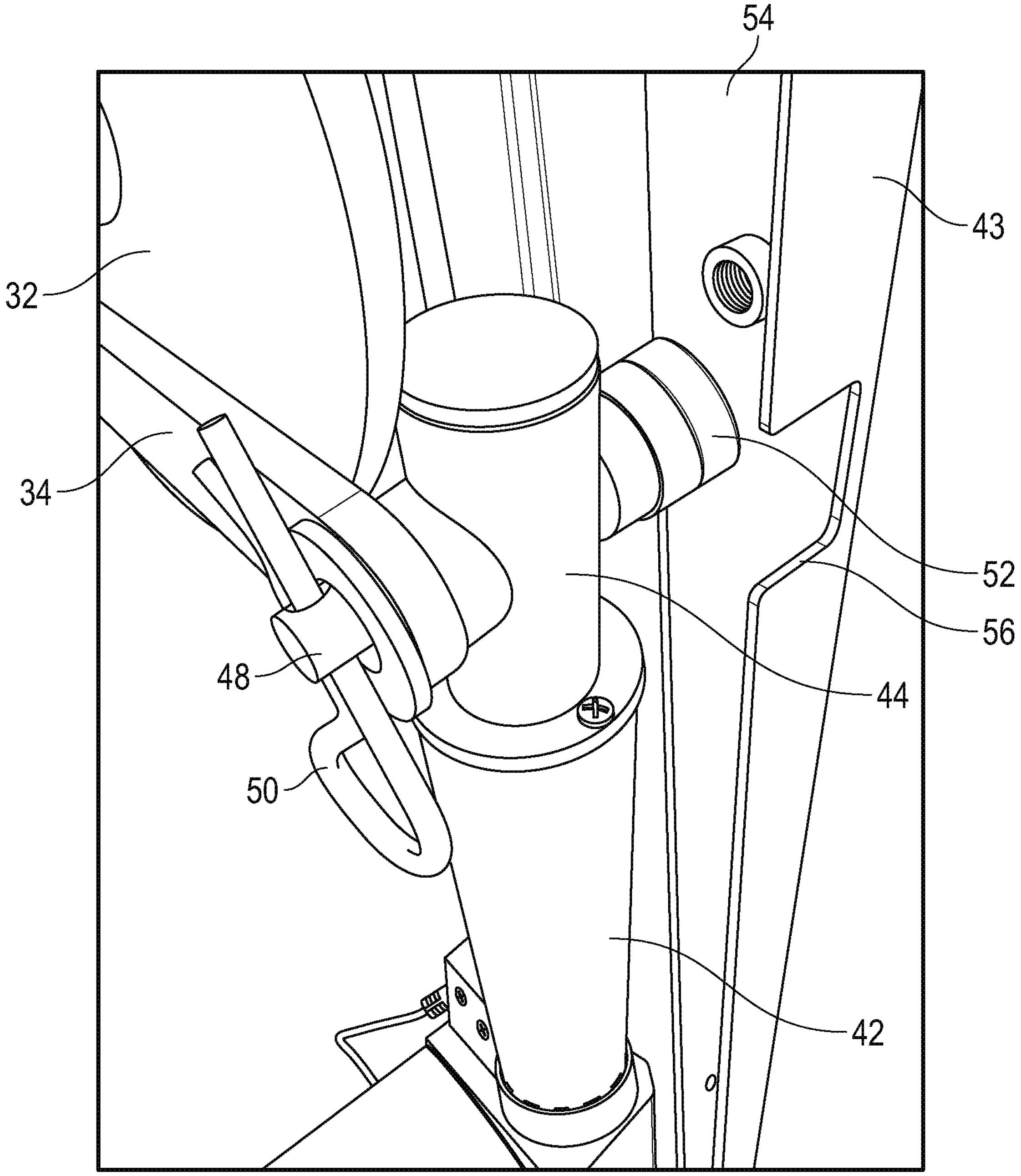
Figure 8:
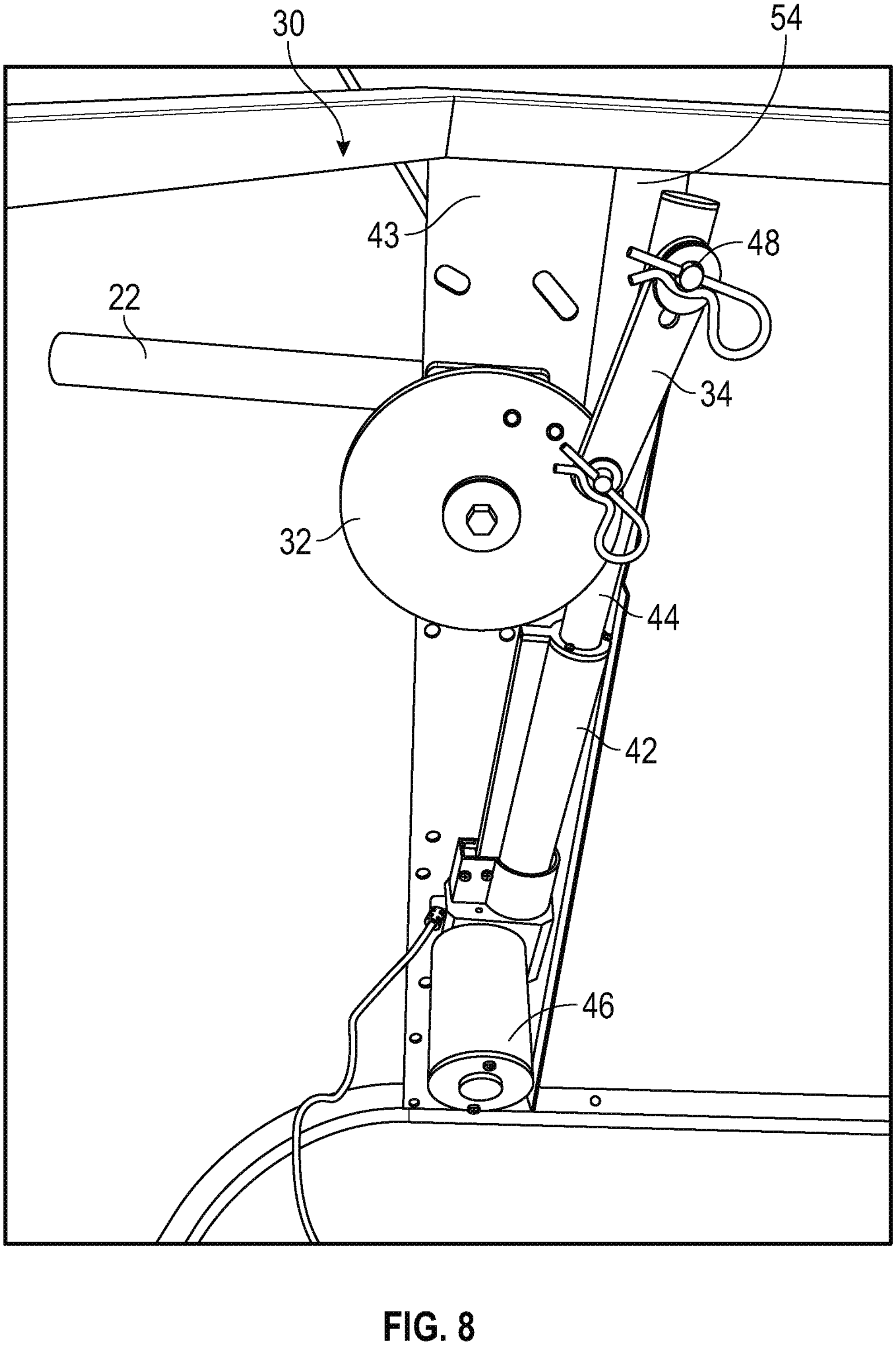
Figure 9:
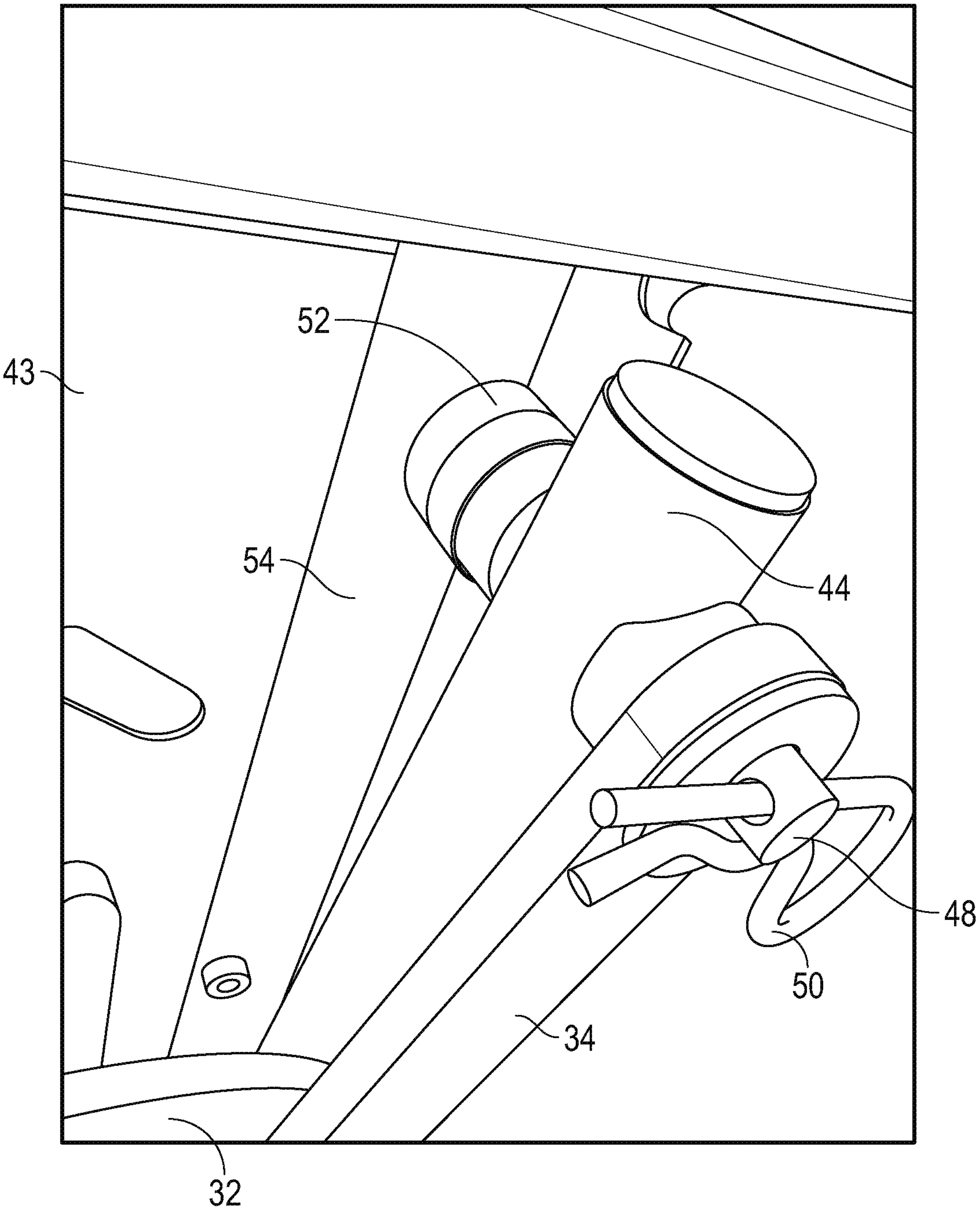

FIG. 6 better illustrates the interconnection of the piston rod 44 and linkage 34. As also shown in FIG. 6, a roller bearing 52 is mounted to the opposite end of the shaft 48 from the linkage 34. The roller bearing 52 is received within a vertical guide channel 54 in the support member 43, the purpose of which will be described hereinafter. Importantly, the guide channel 54 is located laterally offset from the center of the disk 32 and has a width that is greater than the width of the roller bearing 52. As shown in FIG. 6, the guide channel 54 also includes a clearance opening 56, the purpose of which will also be discussed hereinafter.

Figure 10:
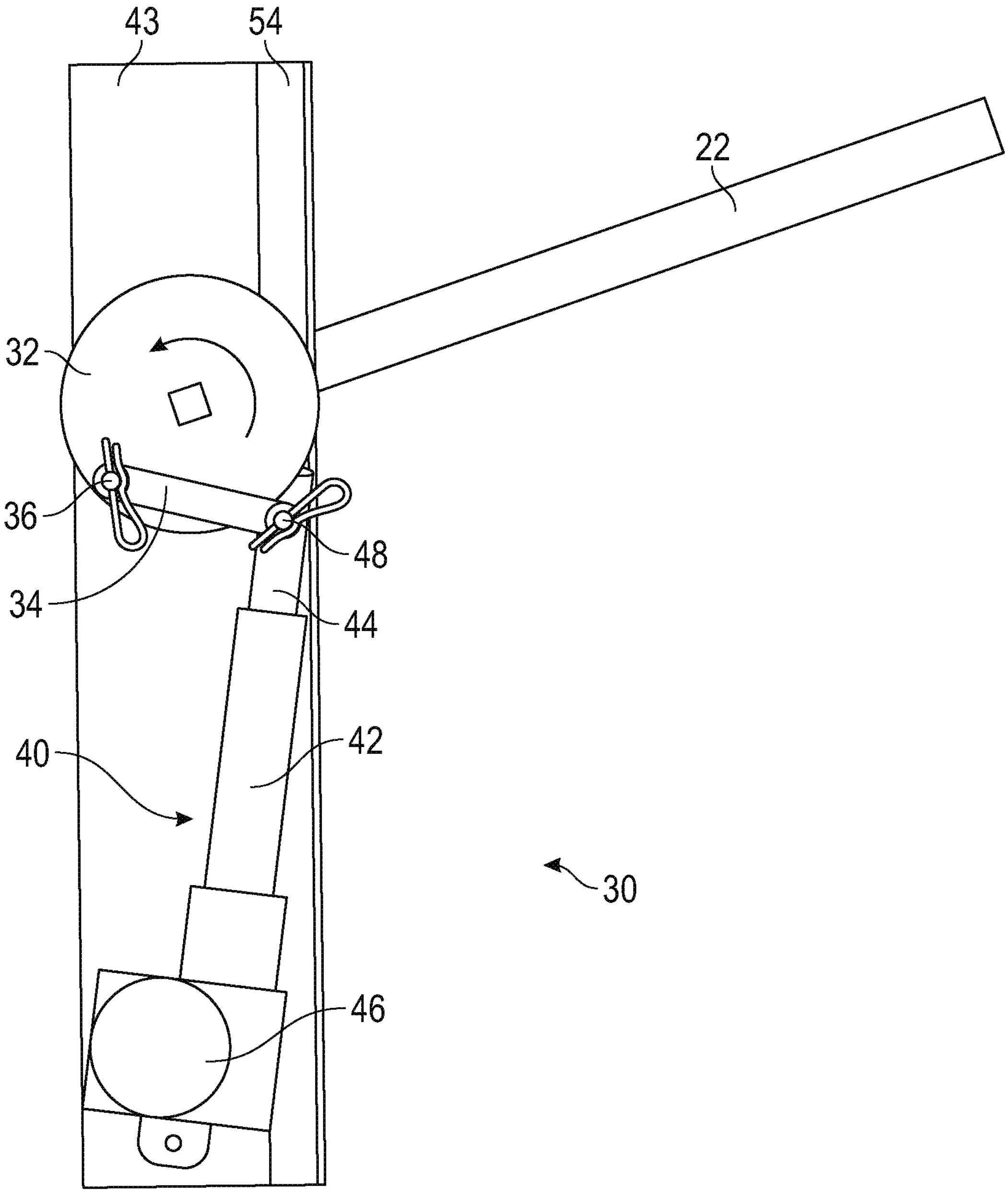
Figure 11:
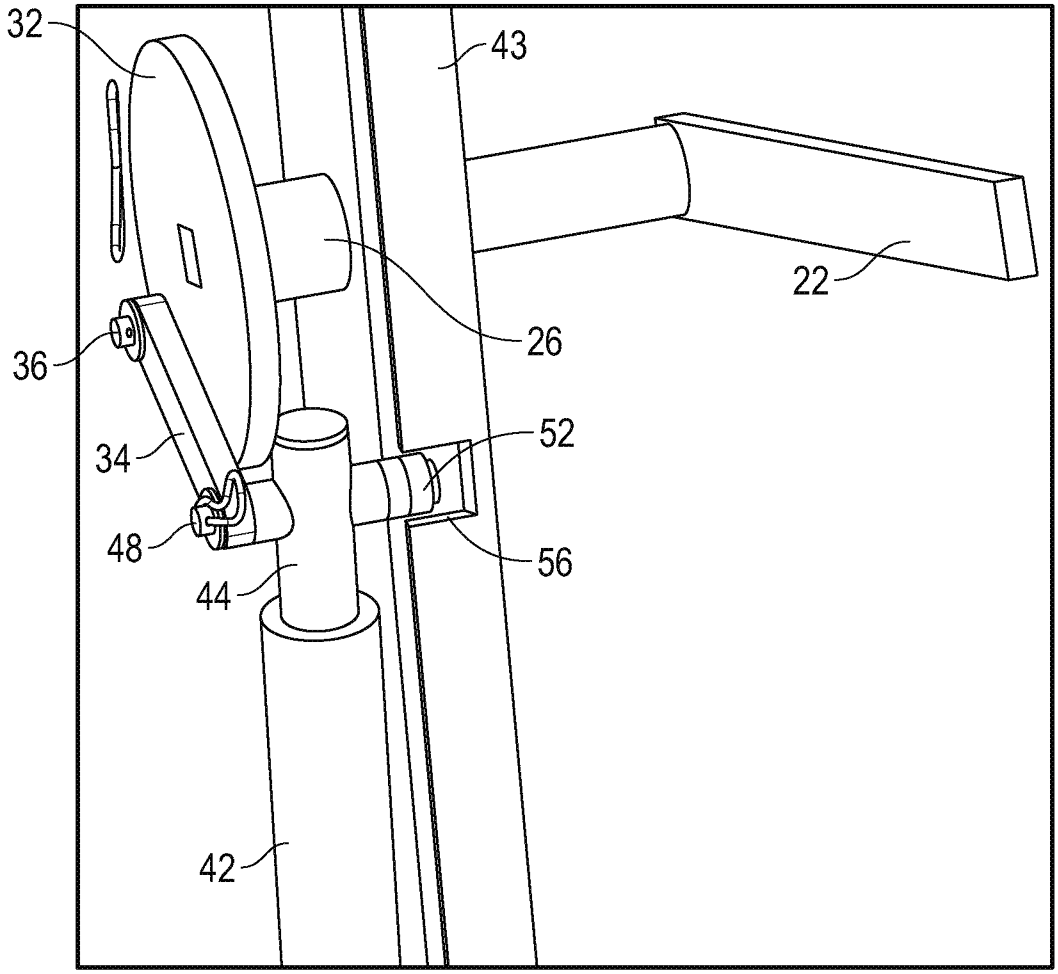
Figure 12:
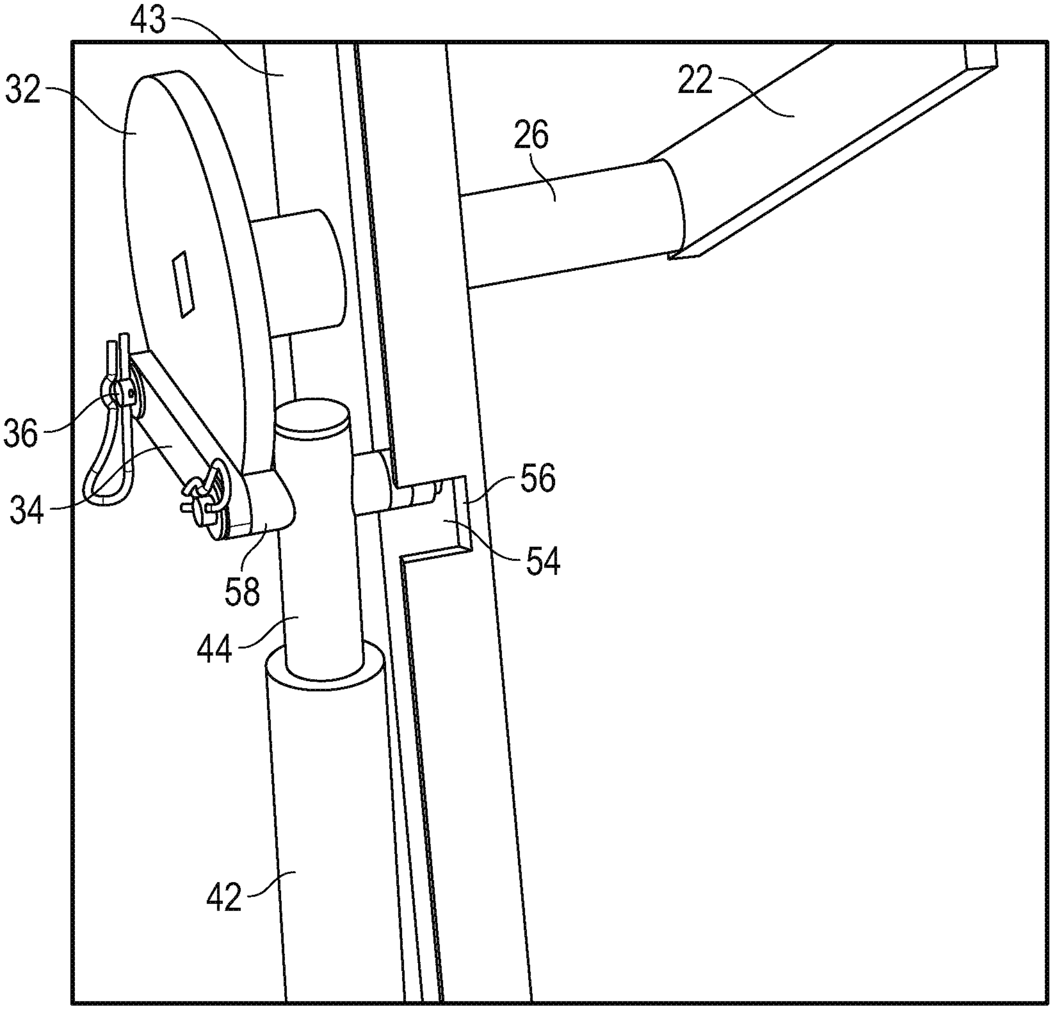
Figure 13:
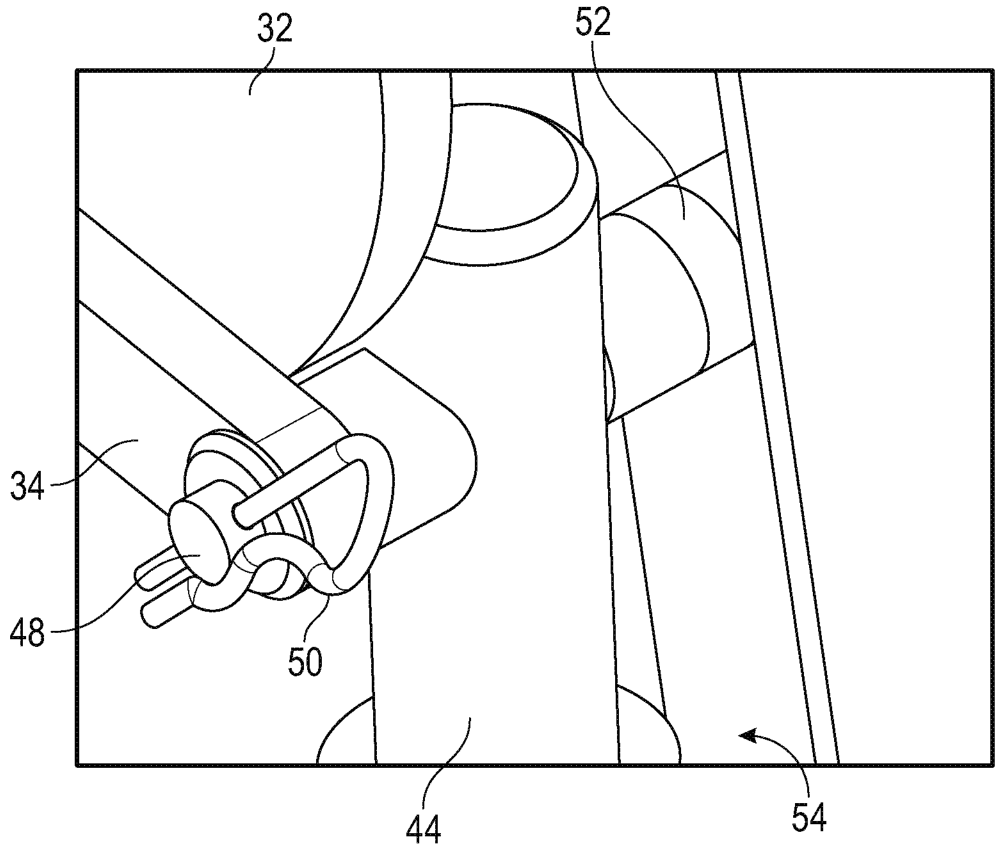
Figure 14:
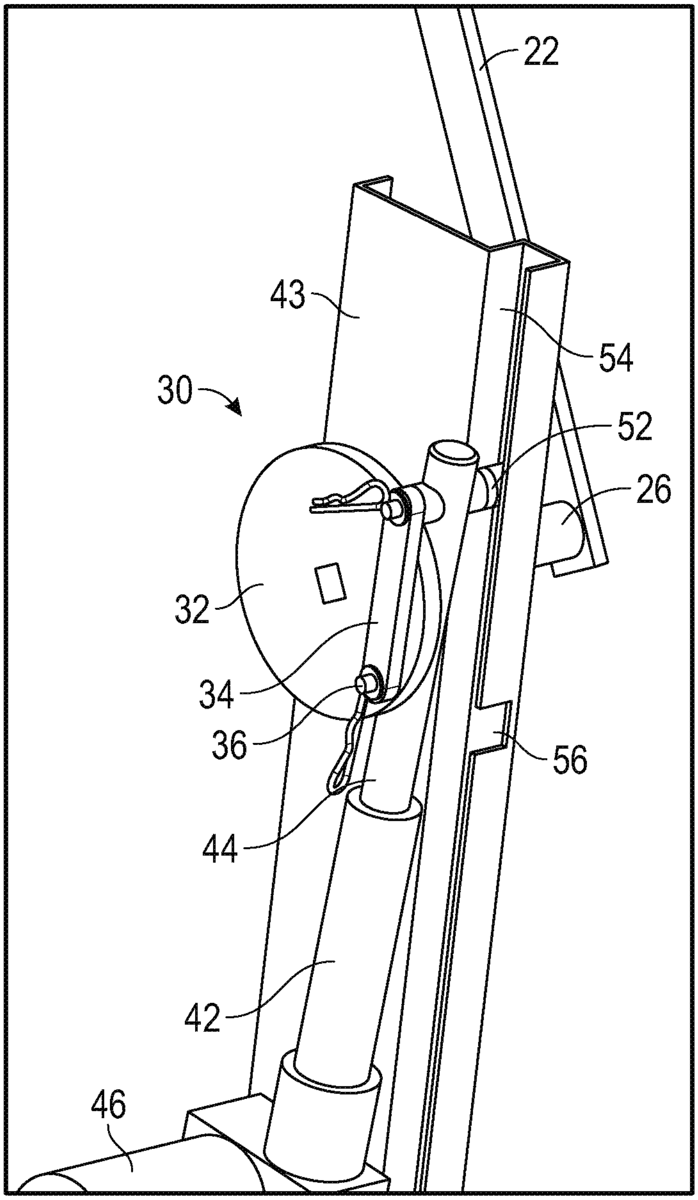
Figure 15:
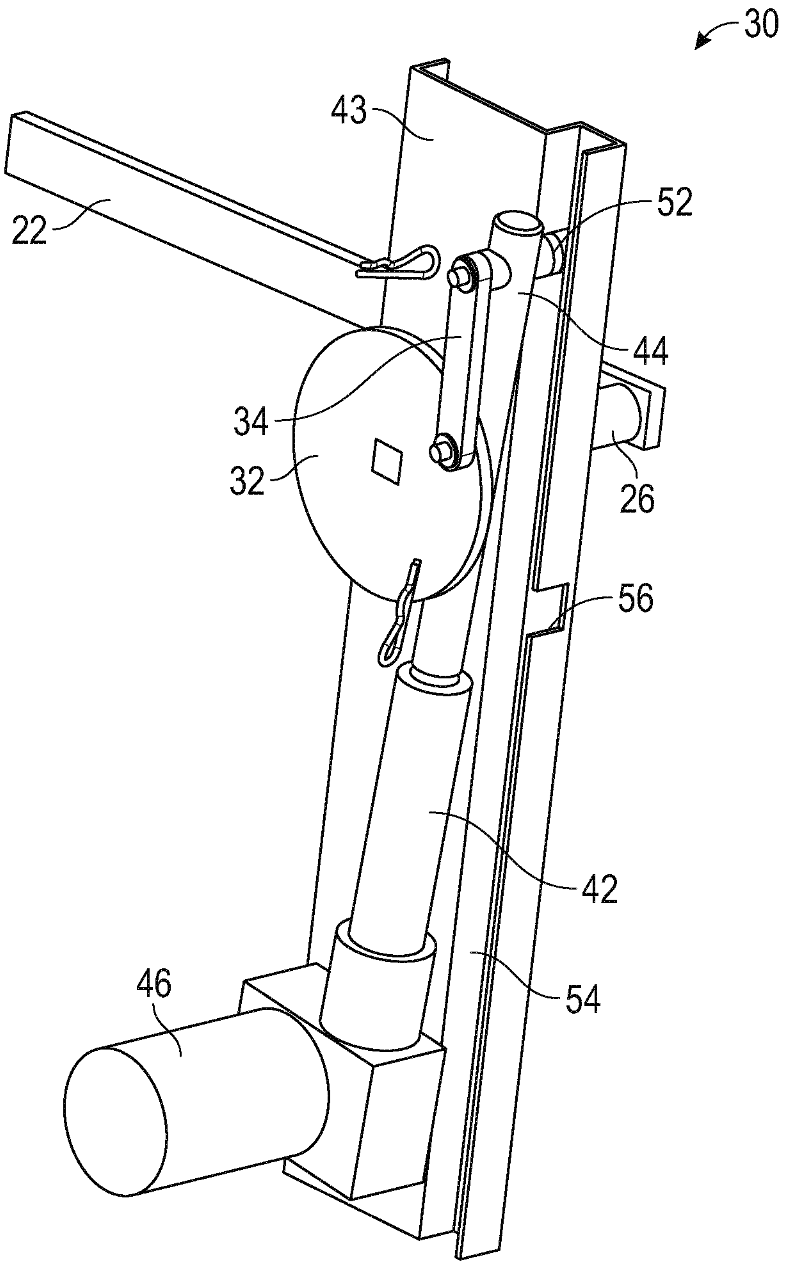

As best shown in FIG. 10, the lower end of the linear actuator 40 is mounted substantially vertically beneath the center of the disk 34, such that in a closed position of the cover 20, the guide cylinder 42 and piston rod 44 extend at a slight angle relative to vertical, and such that the roller bearing 52 is positioned in the channel which is laterally spaced from the center of the disk 34. The motor 46 of the linear actuator 40 may be controlled remotely (via a wireless remote control) or control located on a side of the housing 12 of the spa 10.

In an embodiment, the lift system 30, including the disk 32, linkage 34 and linear actuator 40, are located interior to the housing 12 (i.e., interior to a sidewall of the spa 10), such that the system 30 is substantially hidden from view). It is contemplated, however, that the system 30, including the disk 32, linkage 34 and linear actuator 40, can likewise be located outside the housing 12.

Figure 30:
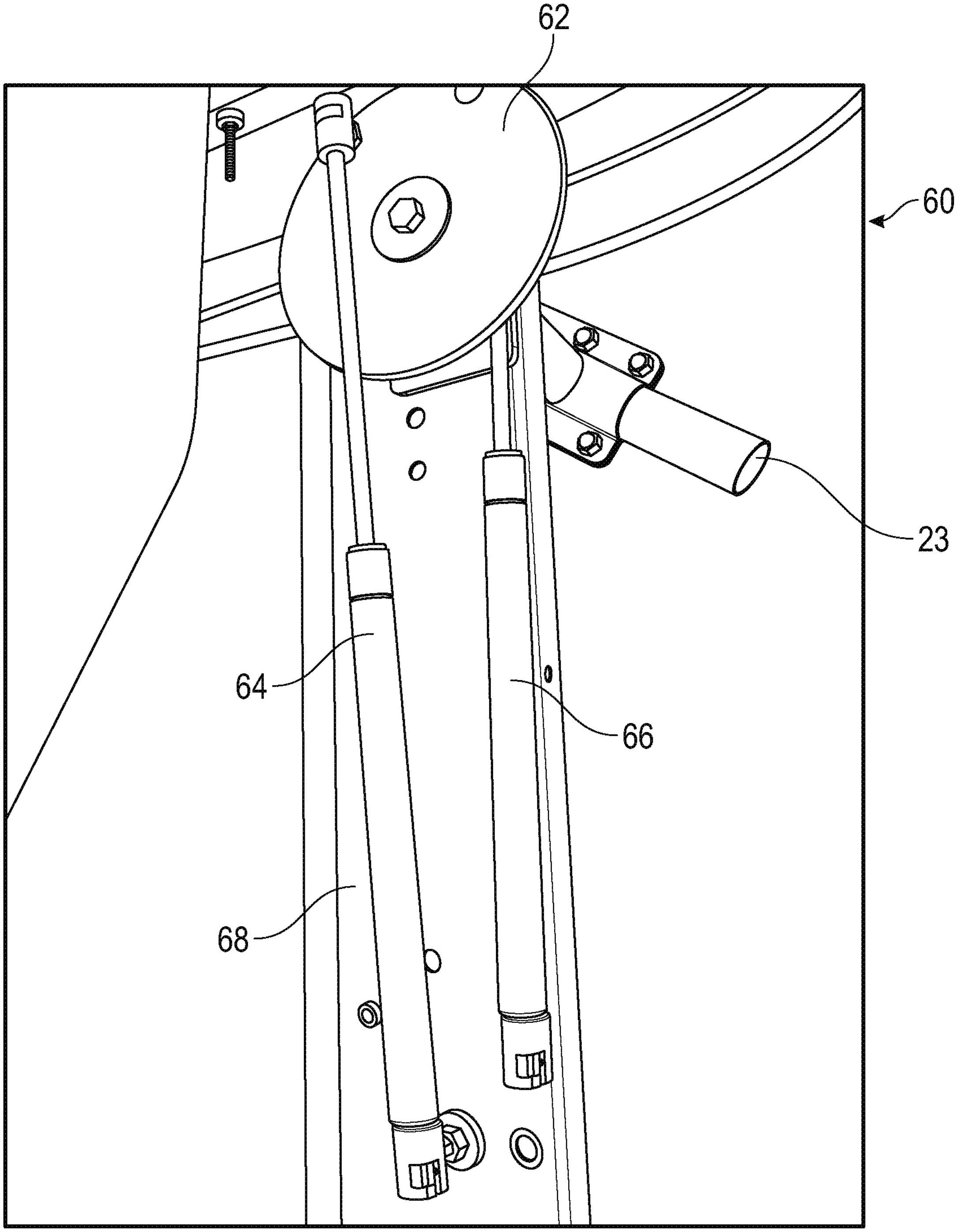
FIGS. 30-32 illustrate a passive cover lift system according to an embodiment of the present invention.
Figure 31:
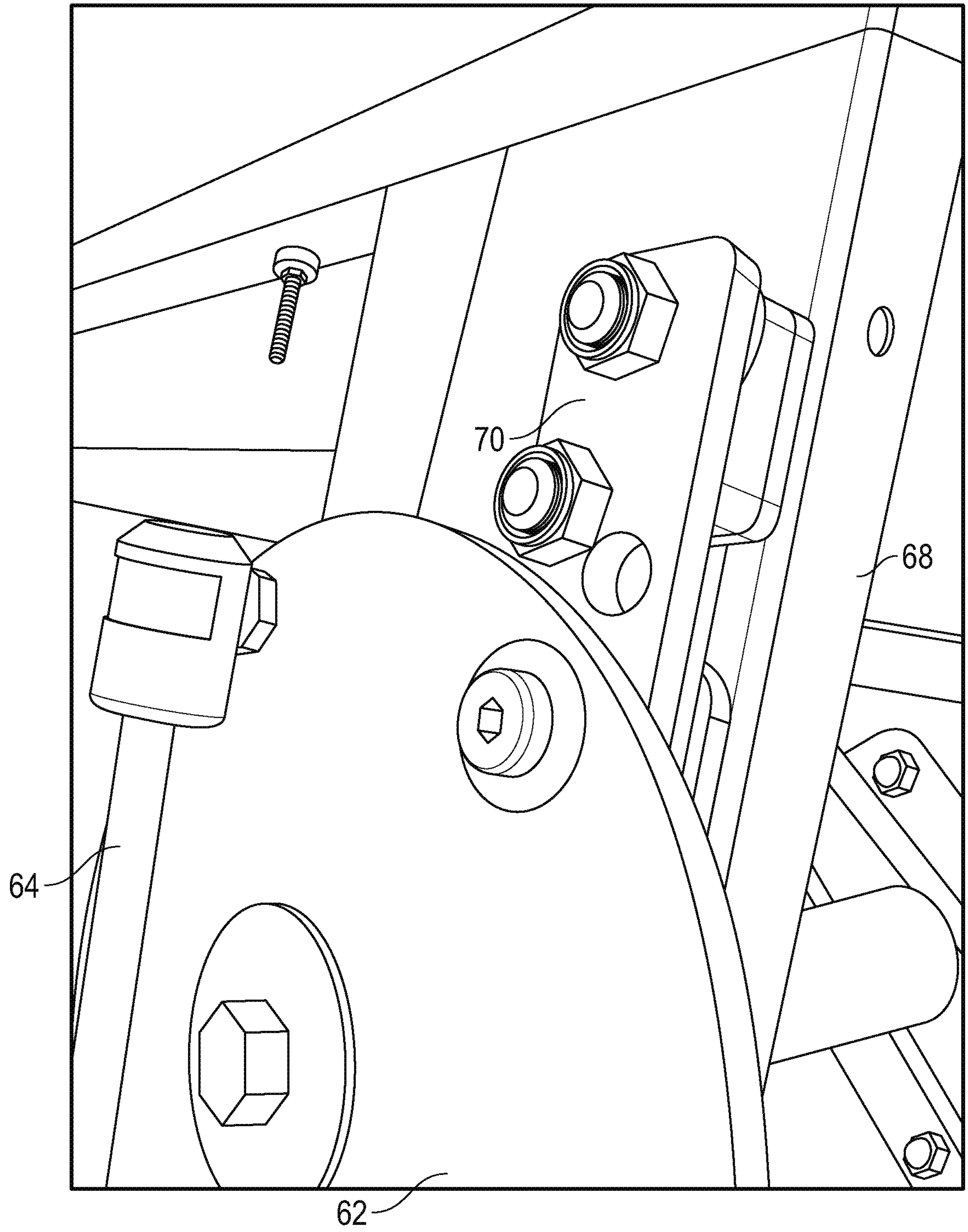
Figure 32:
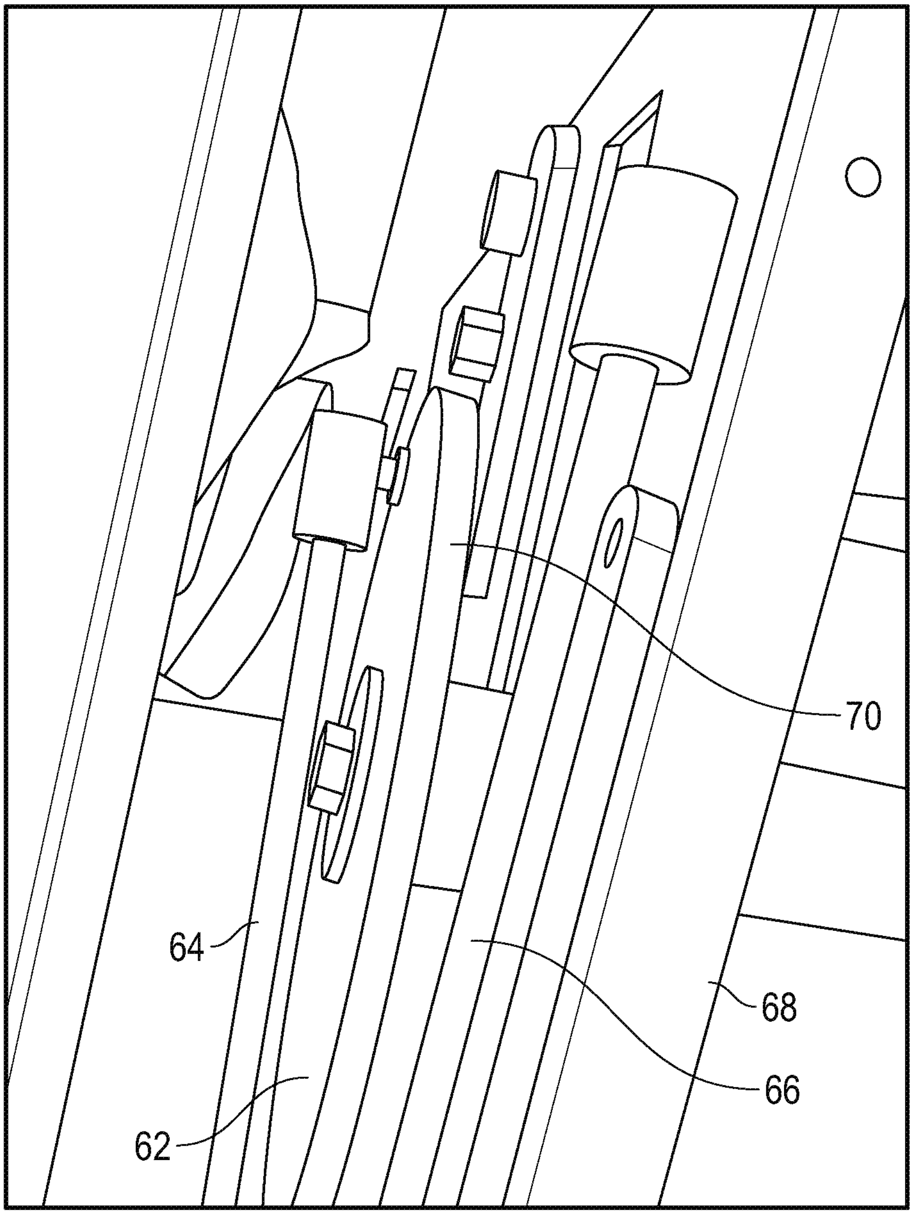

With reference to FIGS. 30-32, in an embodiment, the spa 10 may also include, on an opposite side of the spa from lift system 30, a secondary lift assist system 60. In an embodiment, the secondary lift assist system 60 may be configured similar to the secondary lift assist system shown and disclosed in U.S. Pat. No. 11,359,396, which is incorporated by reference herein in its entirety. Accordingly, the cover 20 (or each cover half, as the case may be) may have on opposing sides thereof a primary lift system 30 which provides the primary motive force for moving the cover between covered and uncovered positions, and a secondary lift system 60 that facilitates balancing and smooth movement of the cover between the covered and uncovered positions, as discussed hereinafter.

As shown in FIGS. 30-32, the secondary lift assist system 60 may include, for example, a plate or disk 62 rigidly connected to the end of the opposing shaft 26 that extends through the side of the housing 12 and which is connected at its opposite end to the opposing lifter arm 23. Similar to plate/disk 32, plate/disk 62 is configured such that rotation of the lever arms 22, 23 imparts a corresponding rotation of the disk 62. In an embodiment, the axis of rotation of the shaft 26 passes through the center of the disk 62. Rather than including a linear actuator, however, the secondary lift assist system 60 includes first and second lift-assist devices 64, 66. The first lift-assist device 64 has a lower end connected to a structural member 68, and an upper end pivotally connected to the disk 62 at a point adjacent to a periphery of the disk (i.e., offset from the axis of rotation of the plate/disk 62). Second lift-assist device 66 has a lower end connected to the structural member 68, and an upper end pivotally connected to a linkage 70 at a first end of the linkage. A second end of the linkage 70 is pivotally connected to the disk 62 at a point adjacent to a periphery of the disk. In an embodiment, the first lift-assist device 64 is pivotally connected to an inside-facing surface of the disk 62, while the second lift-assist device 66 is pivotally connected to an outside-facing surface of the disk 62 via the linkage 70. In an embodiment, the lift-assist devices 64, 66 may be configured as mechanical or gas springs, although other types of passive lift-assist devices known in the art may also be utilized.

Referring back to FIGS. 2-18, operation of the lift system 30 and lift assist system 60 will be discussed. In the closed position of the cover 20 shown in FIGS. 2-8 and 10, the linear actuator 40 extends at a slight angle relative to vertical. In an automatic uncovering mode of operation, the linear actuator 40 is actuated by remote or housing-based control. This causes the piston rod 44 to extend from the guide cylinder 42. As best shown in FIGS. 6, 7, 12 and 13, this movement of the piston rod 44 causes the linkage 34 to rotate about pin 36 until the drive ring 58, which surrounds the shaft 48 contacts the disk 32, which causes the disk 32 to rotate about its axis, providing torque to the shaft 26. After the disk 32 rotates for a bit, the drive ring 58 leaves the disk (as the disk 32 is allowed to move laterally within the channel 54) and then the force is transferred to the pin 36 thru the linkage 34 as the piston rod 44 continues to extend and the roller bearing 52 travels upwardly within the channel 54. This continued upward movement of the piston rod 44 pulls upward on the periphery of the disk via the linkage 34. As the connection point of the linkage 34 with the disk 32 is offset from a center of the disk 32, it thus causes the disk 32 to rotate (in the counterclockwise direction in FIG. 8). This rotational force is transmitted through the shaft 62 and lifter to the cover 20, causing the cover to move to the open, uncovered position (shown in FIGS. 8 and 15). This configuration and movement allows for a very constant torque throughout the opening part of the cycle.

Figure 16:
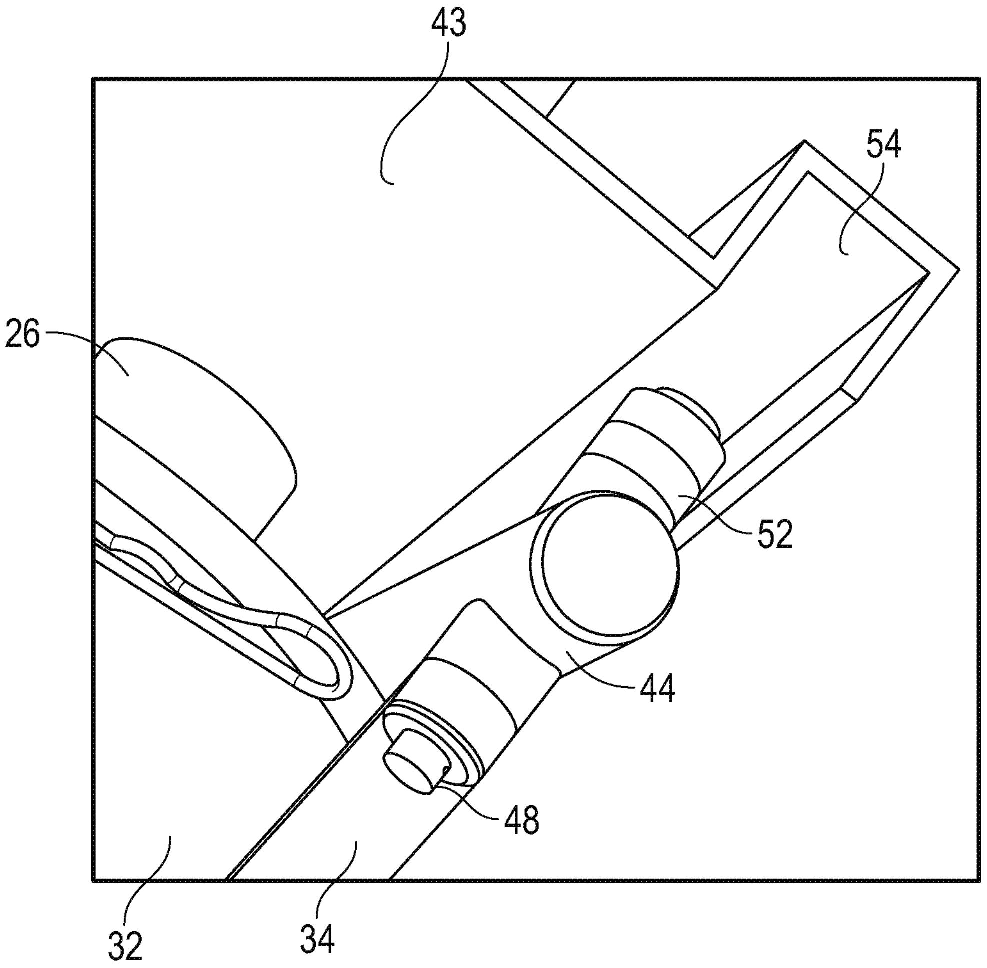
Figure 17:
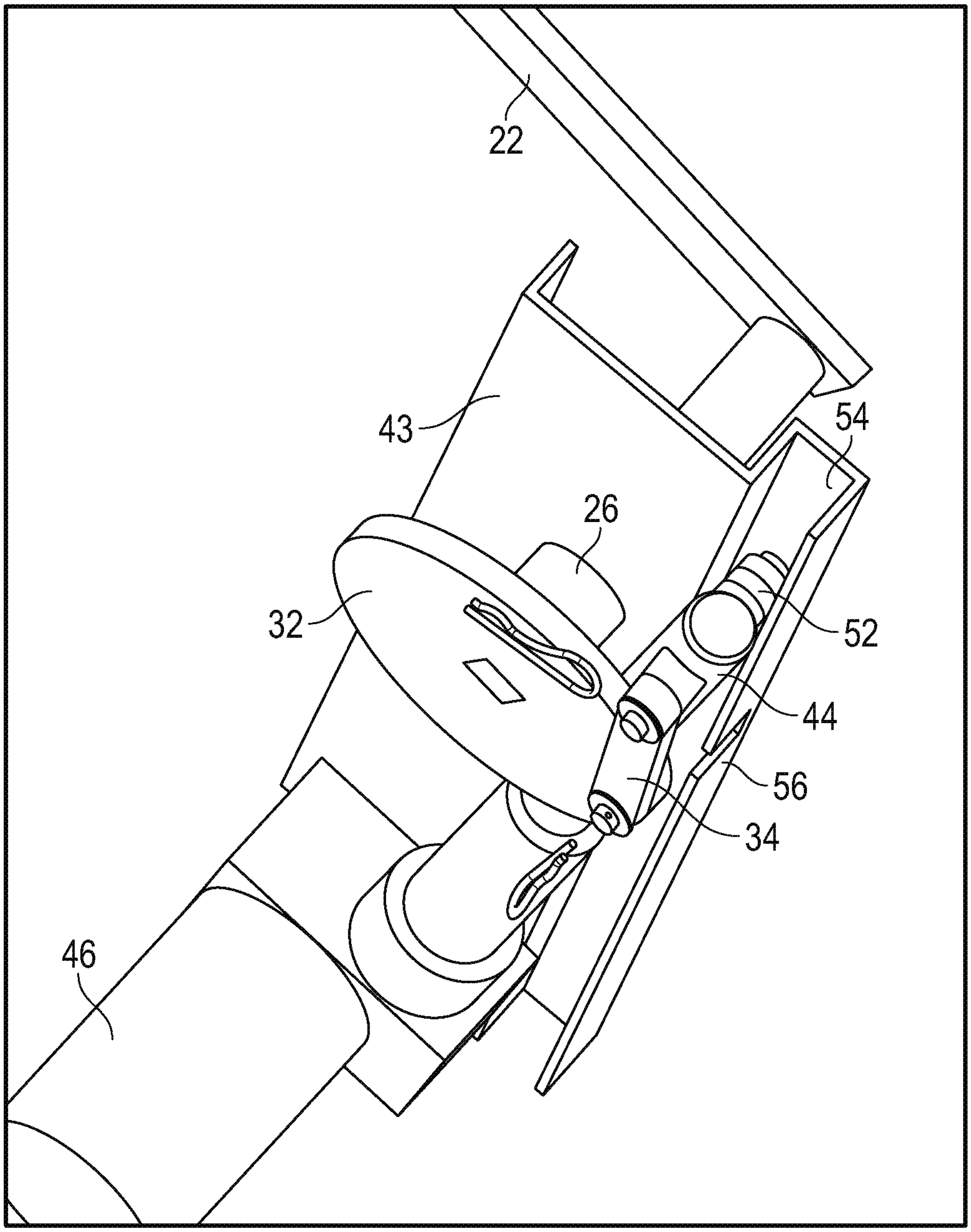
Figure 18:
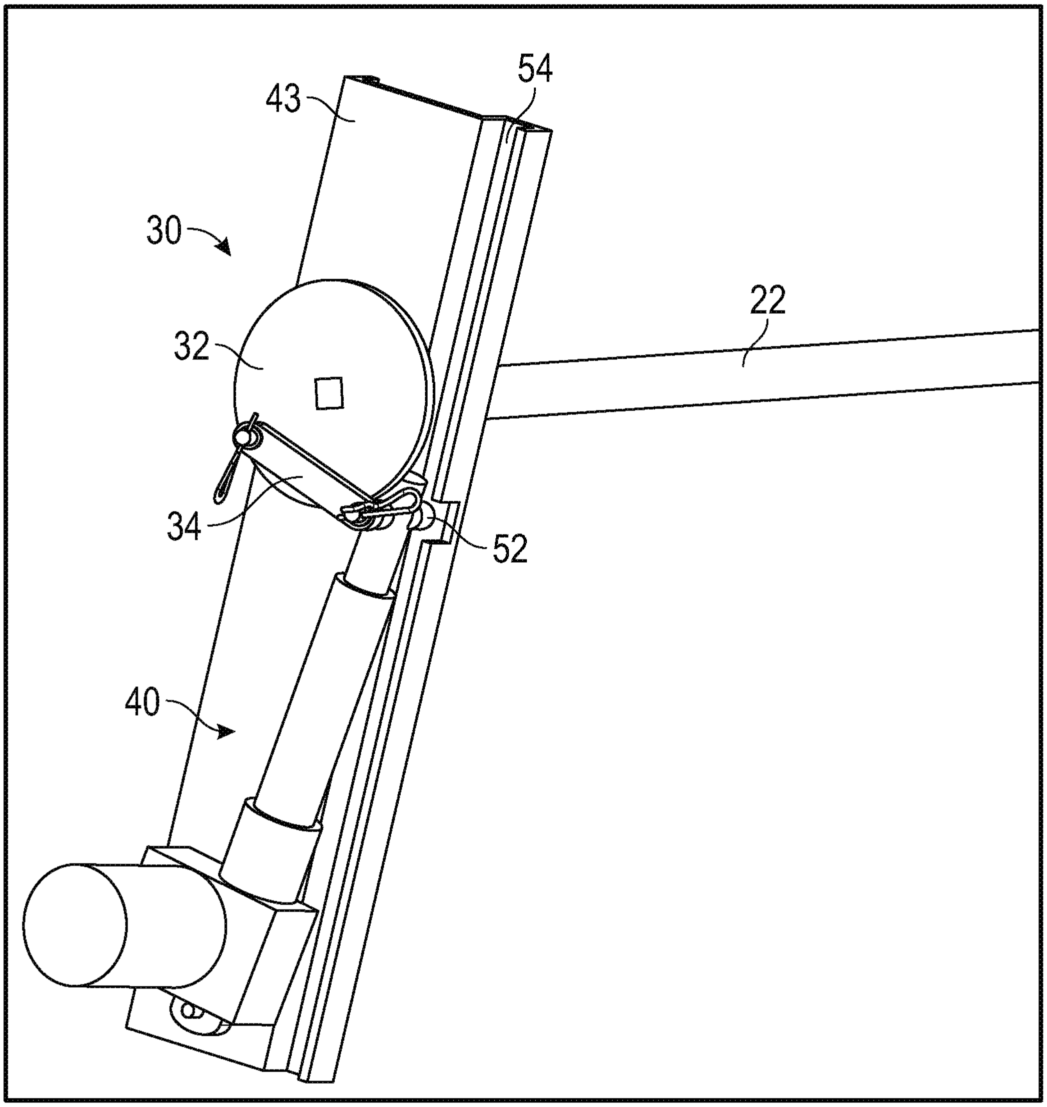
Figure 19:
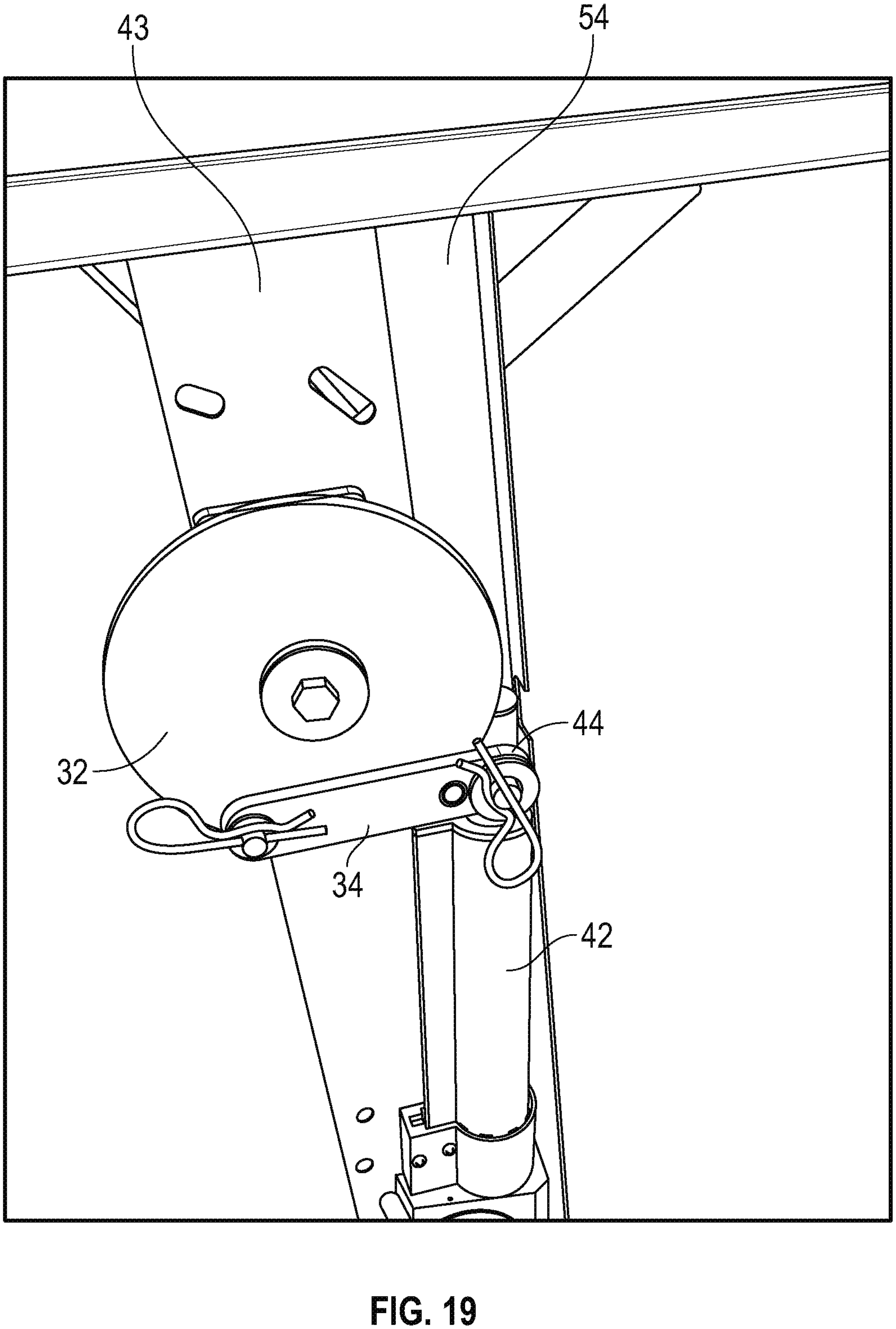
Figure 20:
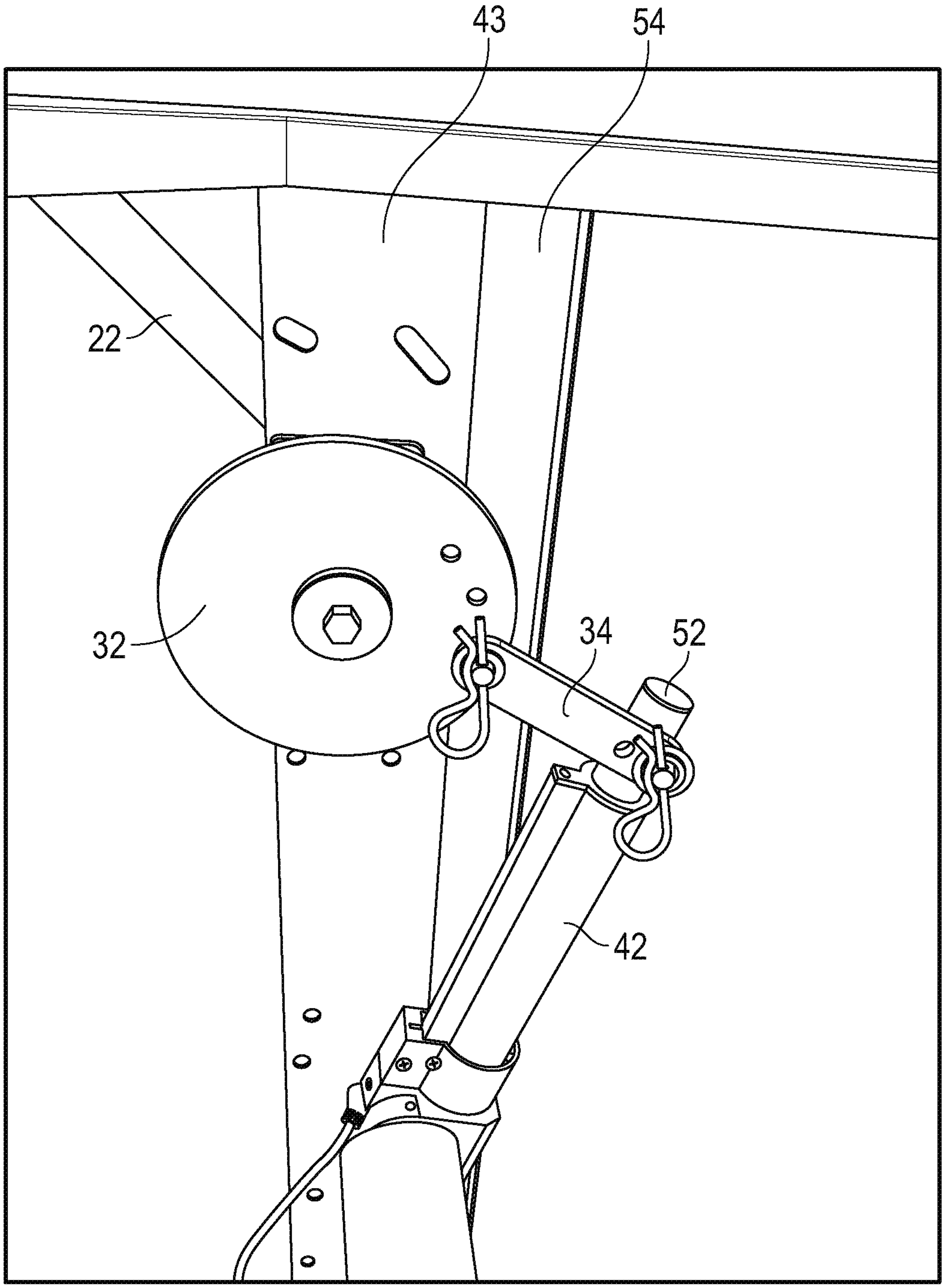
Figure 21:
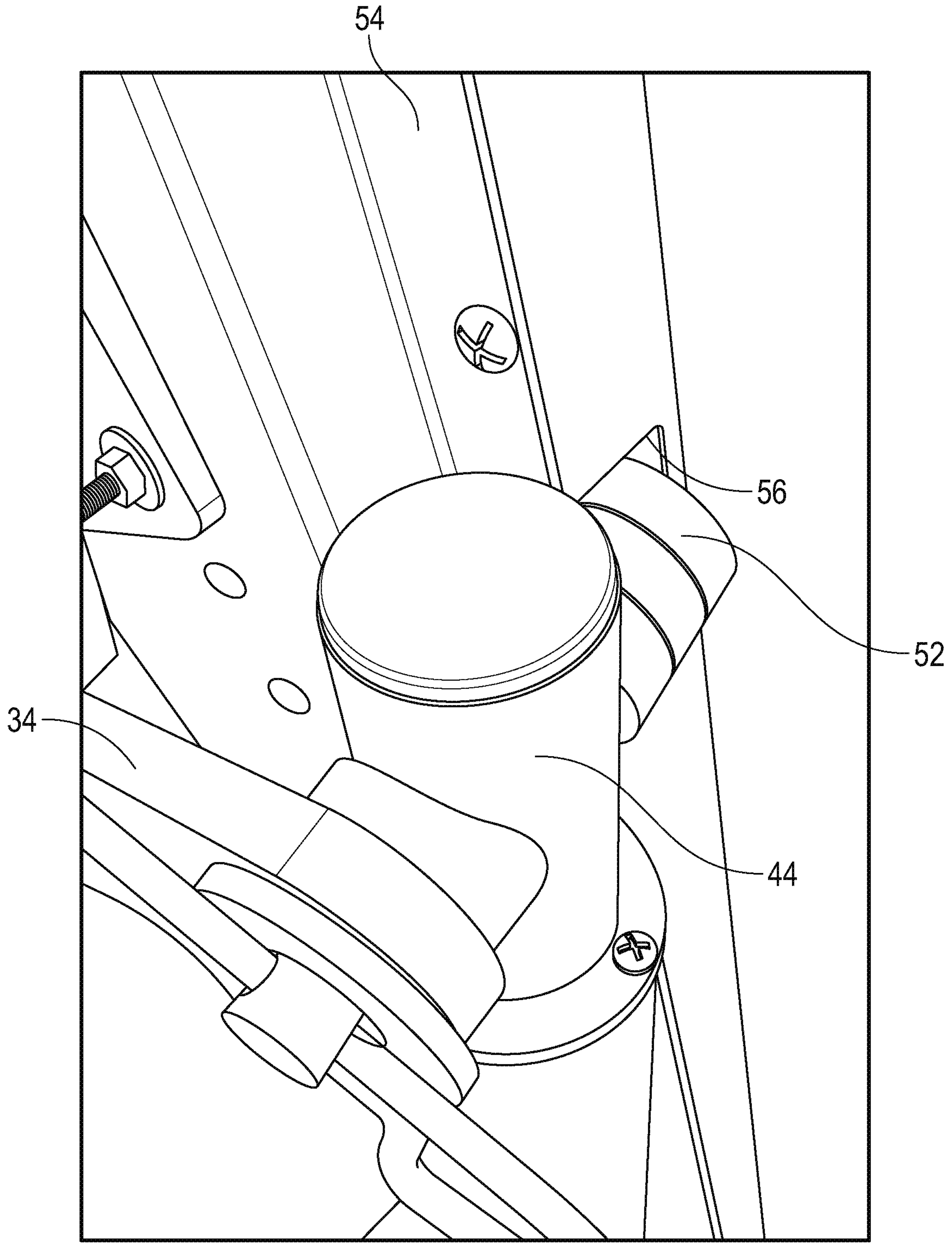
Figure 22:
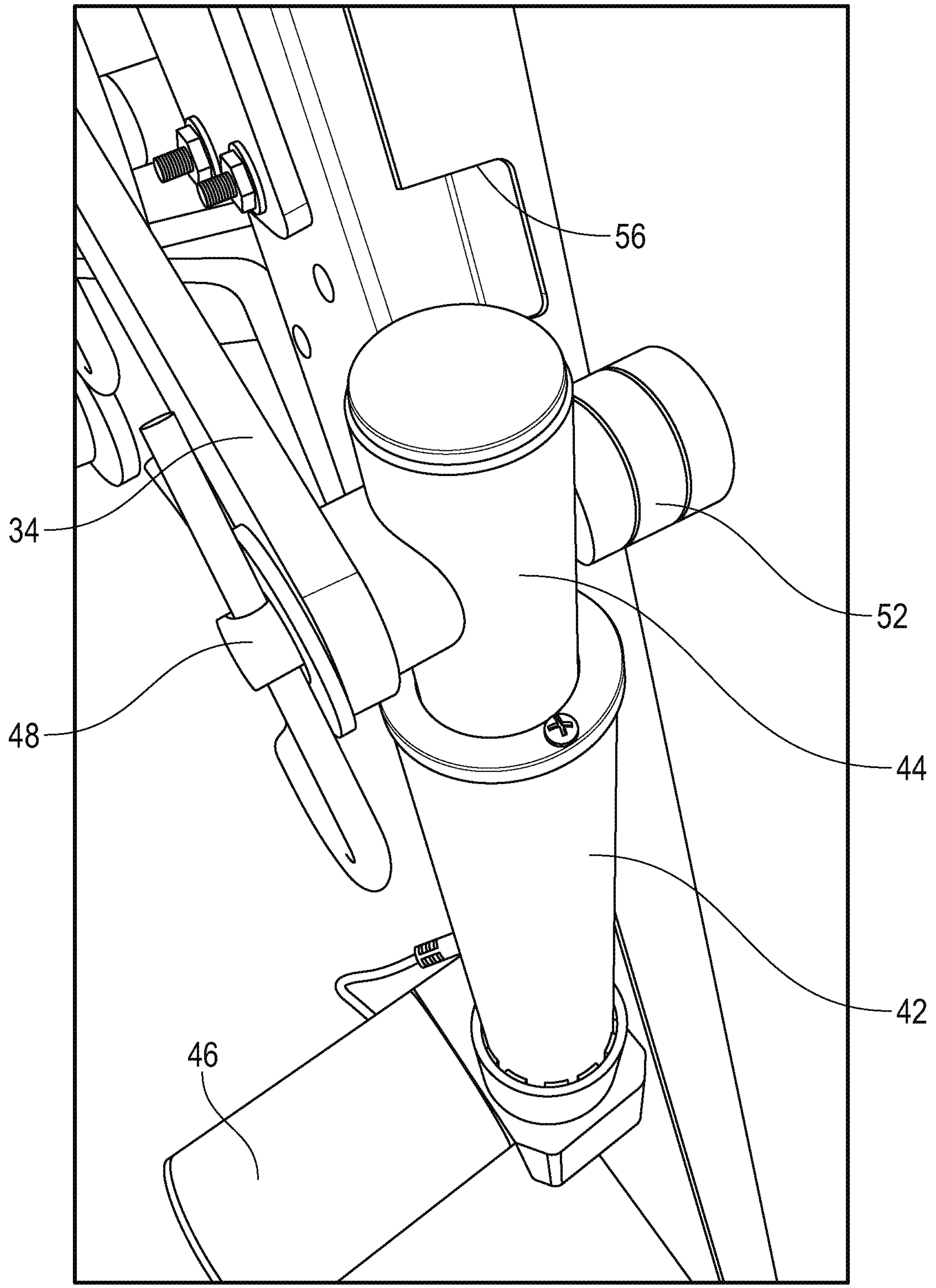
Figure 23:
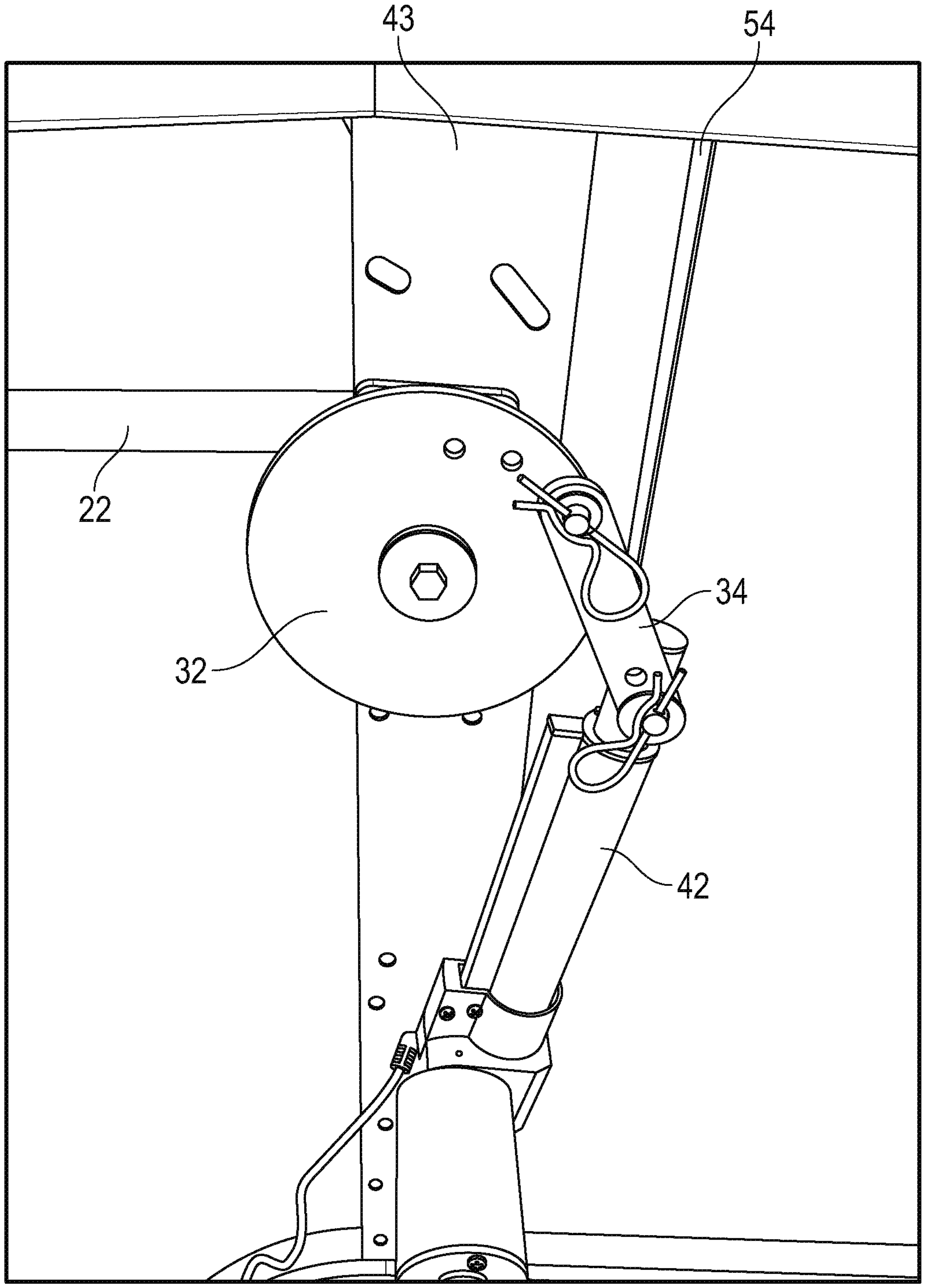
Figure 24:
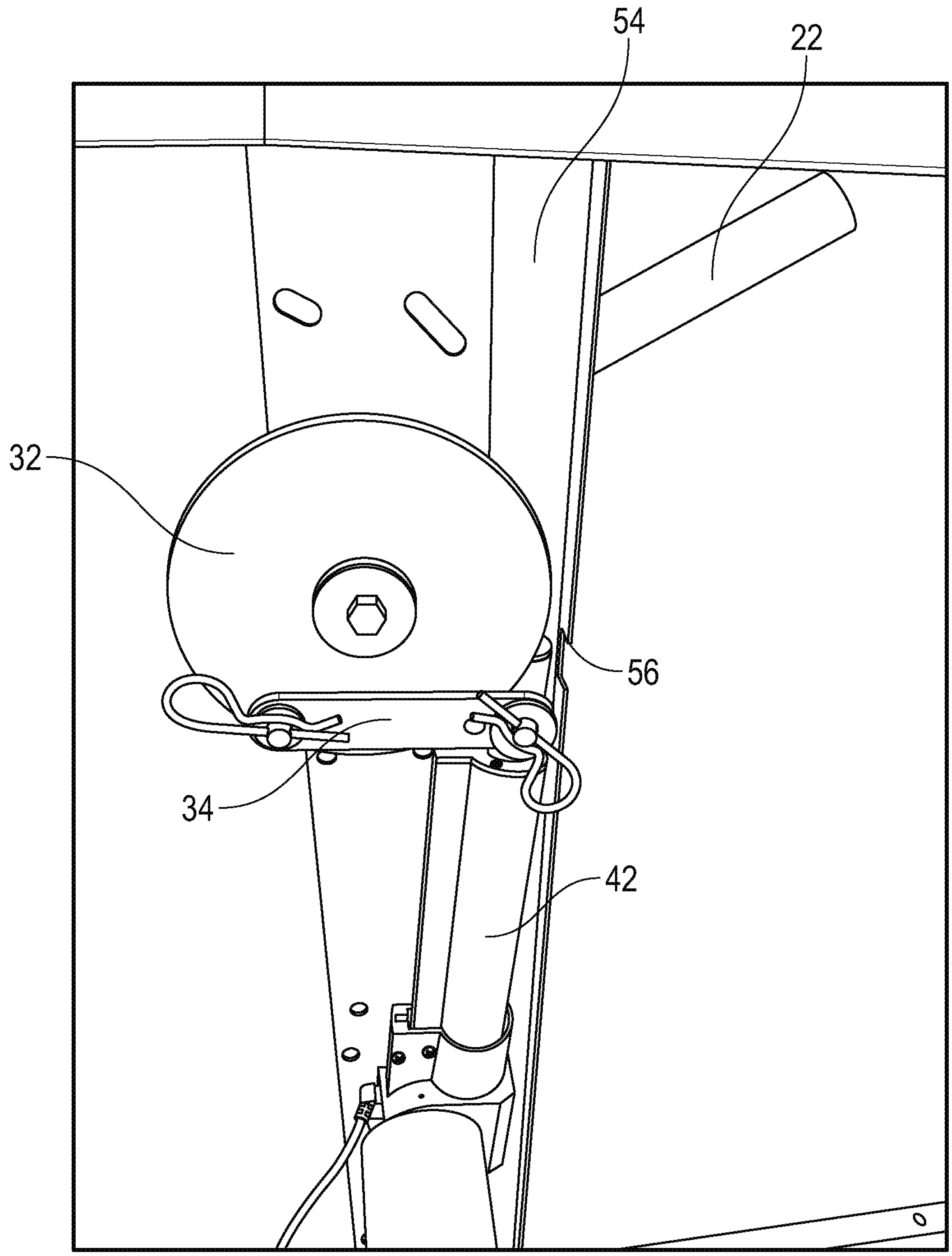
Figure 25:
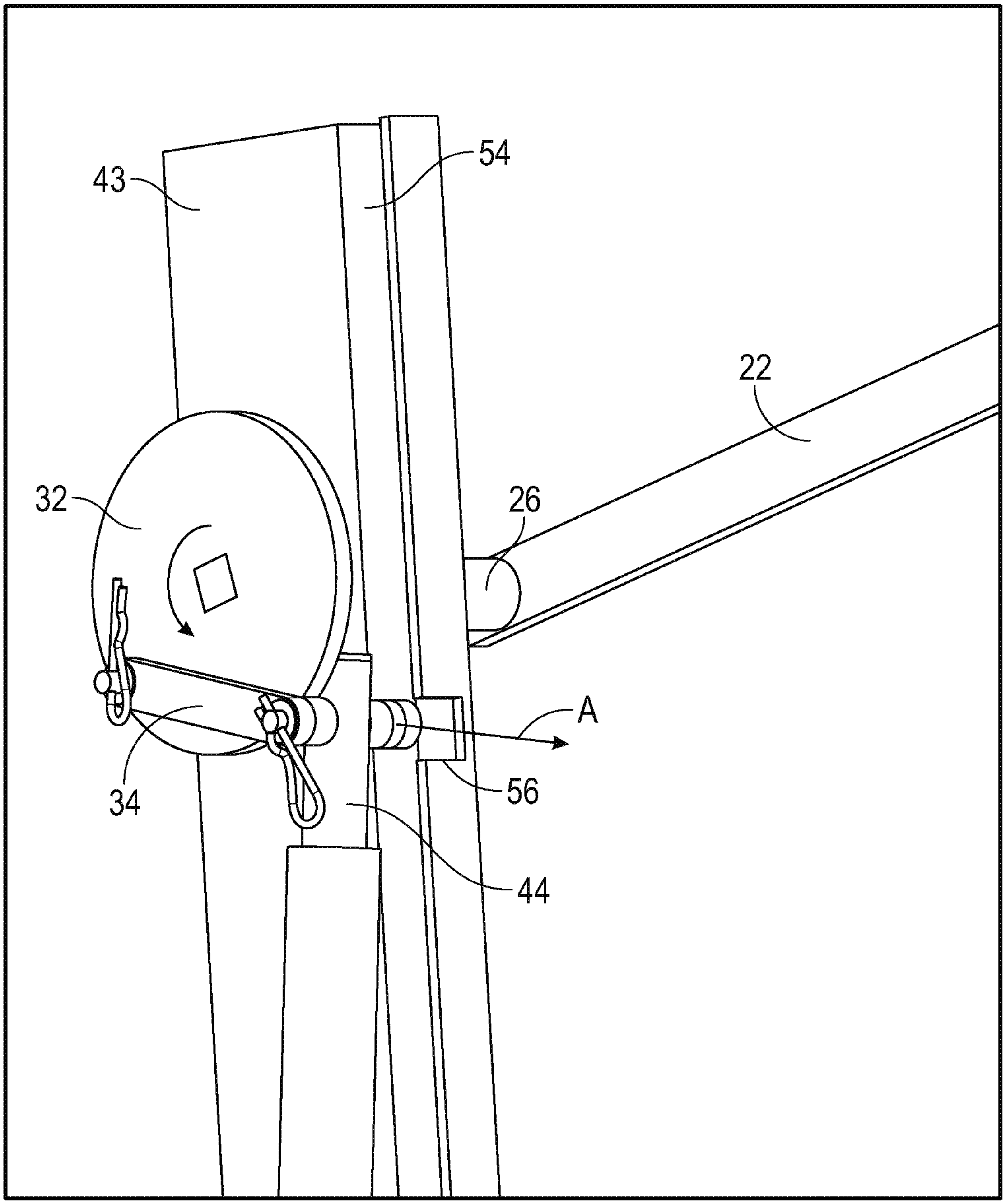

Movement of the cover 20 to the closed or covered position is similar, except that when the piston rod 44 is retracted into the guide cylinder 42 and pulls down on the linkage 34, the roller bearings 52 move out against the wall of the channel 54 (as best shown in FIGS. 16 and 17) and keep the force train straight, applying torque to the pin 36 until the disk 32 rotates into position where the bearings 52 are pulled away from the wall and it stops. This way, the disk 32 sees relatively constant torque to the cover 20 through the whole cycle.

Figure 26:
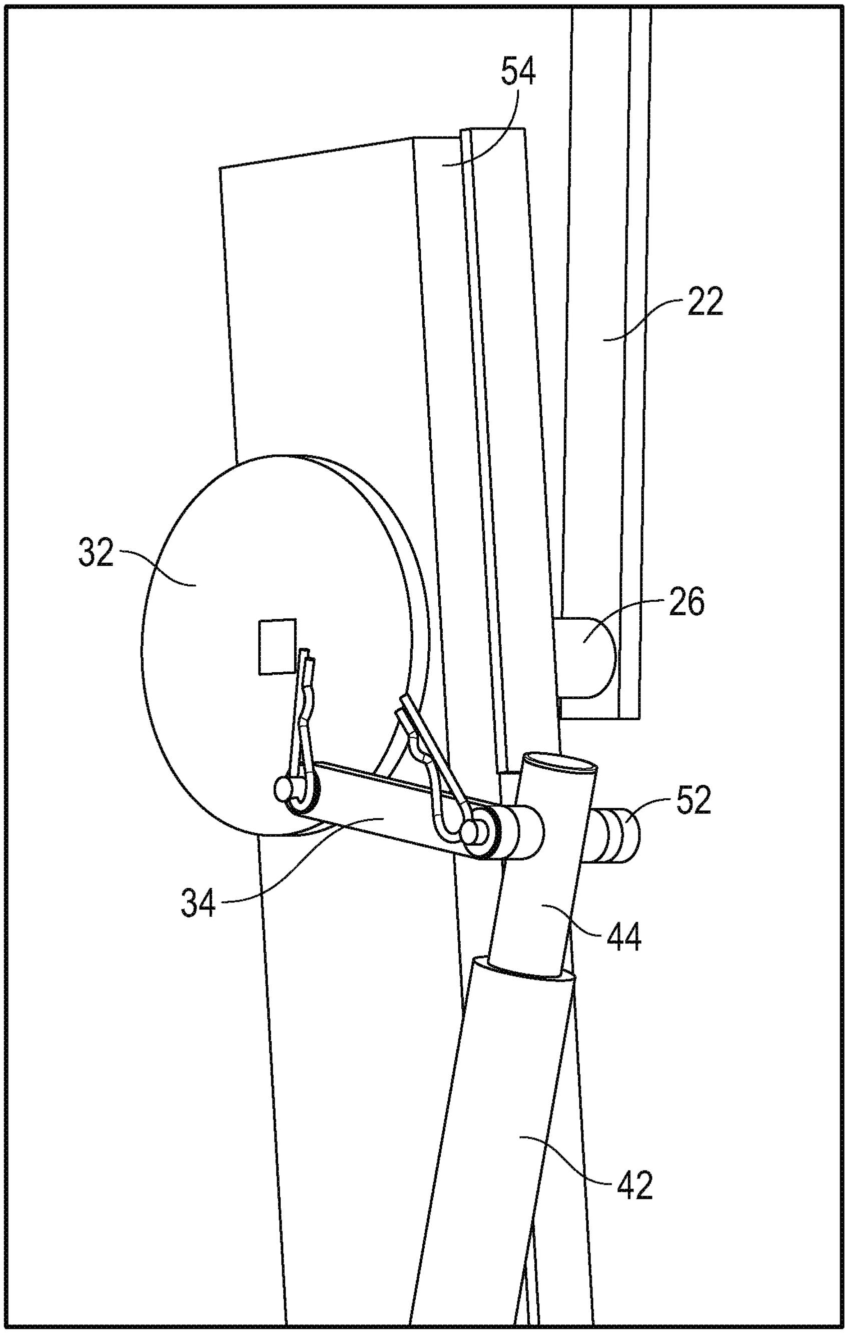
Figure 27:
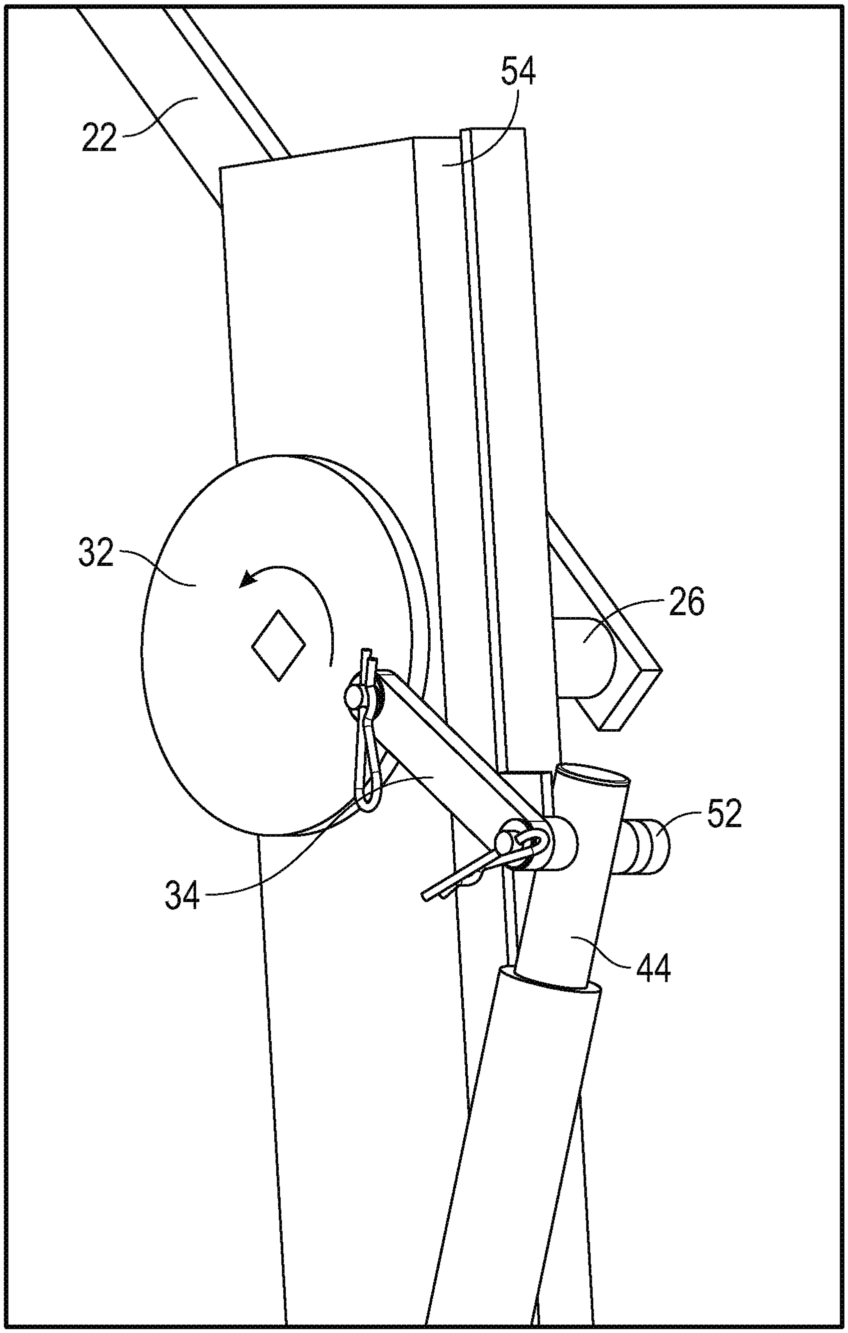
Figure 28:
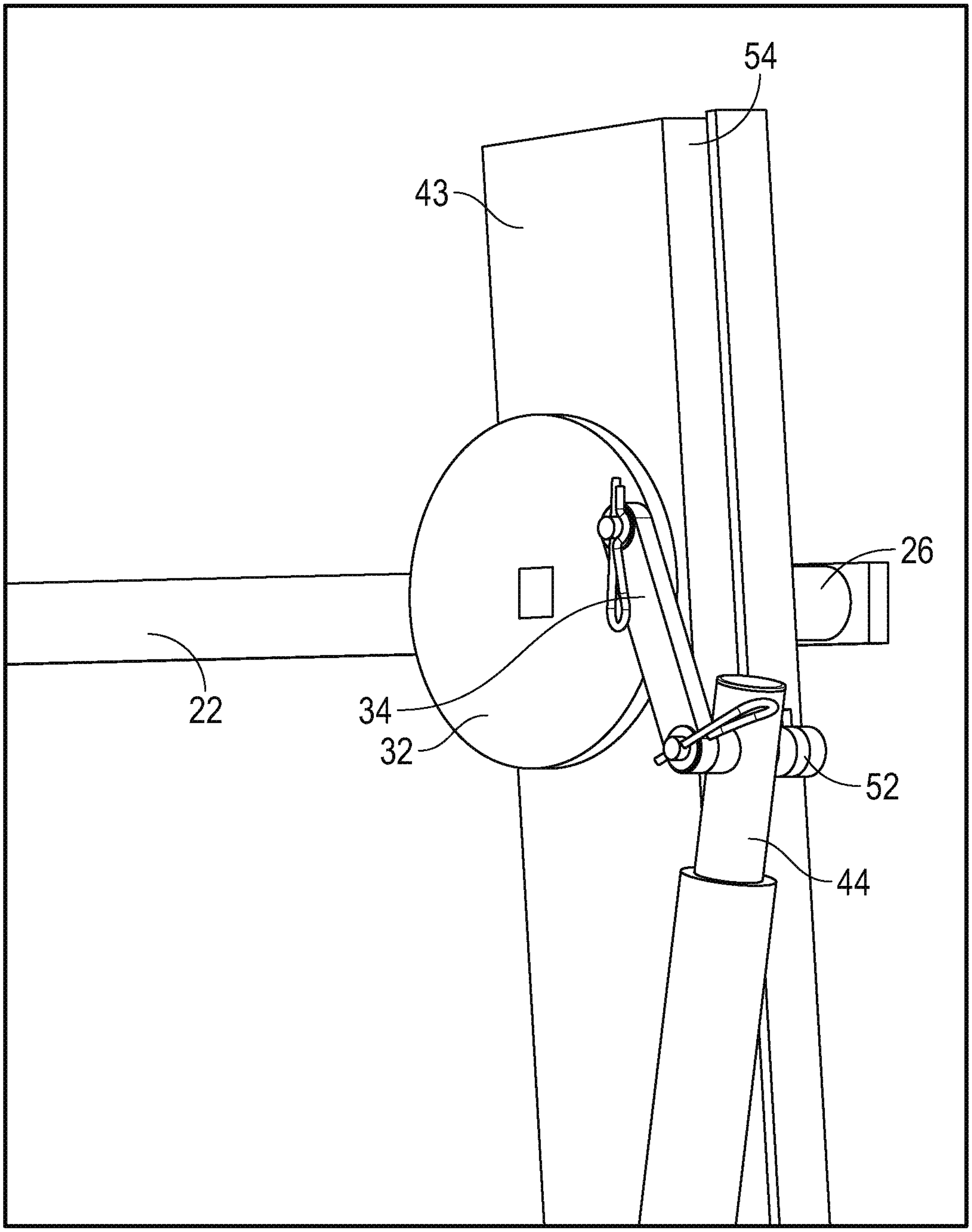

Referring now to FIGS. 19-29, the lift system 30 (and secondary lift system 60) is also operable in a manual mode of operation to selectively move the cover 20 between the covered and uncovered positions. As shown therein, in a manual mode of operation, when the cover 20 is in the covered position, a user may grasp either lifter arm 22, 23 at the distal end thereof and pull on the cover to rotate the lifter arms 22, 23 about the shafts 26, which also causes the connected disk 32 to rotate in the direction of the arrow shown in FIG. 25. As the disk 32 rotates in the direction of the arrow, the end of the linkage 34 opposite the disk 32 rotates downwardly and the linear actuator 40 is rotated outwardly about its connection point with the support 43 due to the connection with the disk 32 via the linkage 34. This causes the roller bearing 52 to move in the direction of arrow A in FIG. 25, causing it can exit the channel 54 through the clearance opening 56, as shown in FIGS. 26 and 27. In this position, the linear actuator 40 forms a greater angle with respect to vertical. In this position, the roller bearing 52 is not restrained in the channel 54, and lifter arm 22 and disk 32 are free to rotate without the linear actuator 40 coming into play. In particular, movement of the linear actuator 40 to the position shown in FIGS. 26 and 27 effectively decouples the linear actuator 40 from the cover movement cycle, allowing the cover 20 to be opened and closed manually and without assistance or interference from the linear actuator 40. FIG. 28 illustrates the position of the lifter arm 22 and the lift system 30 in the uncovered position in the manual mode of operation.

Figure 29:
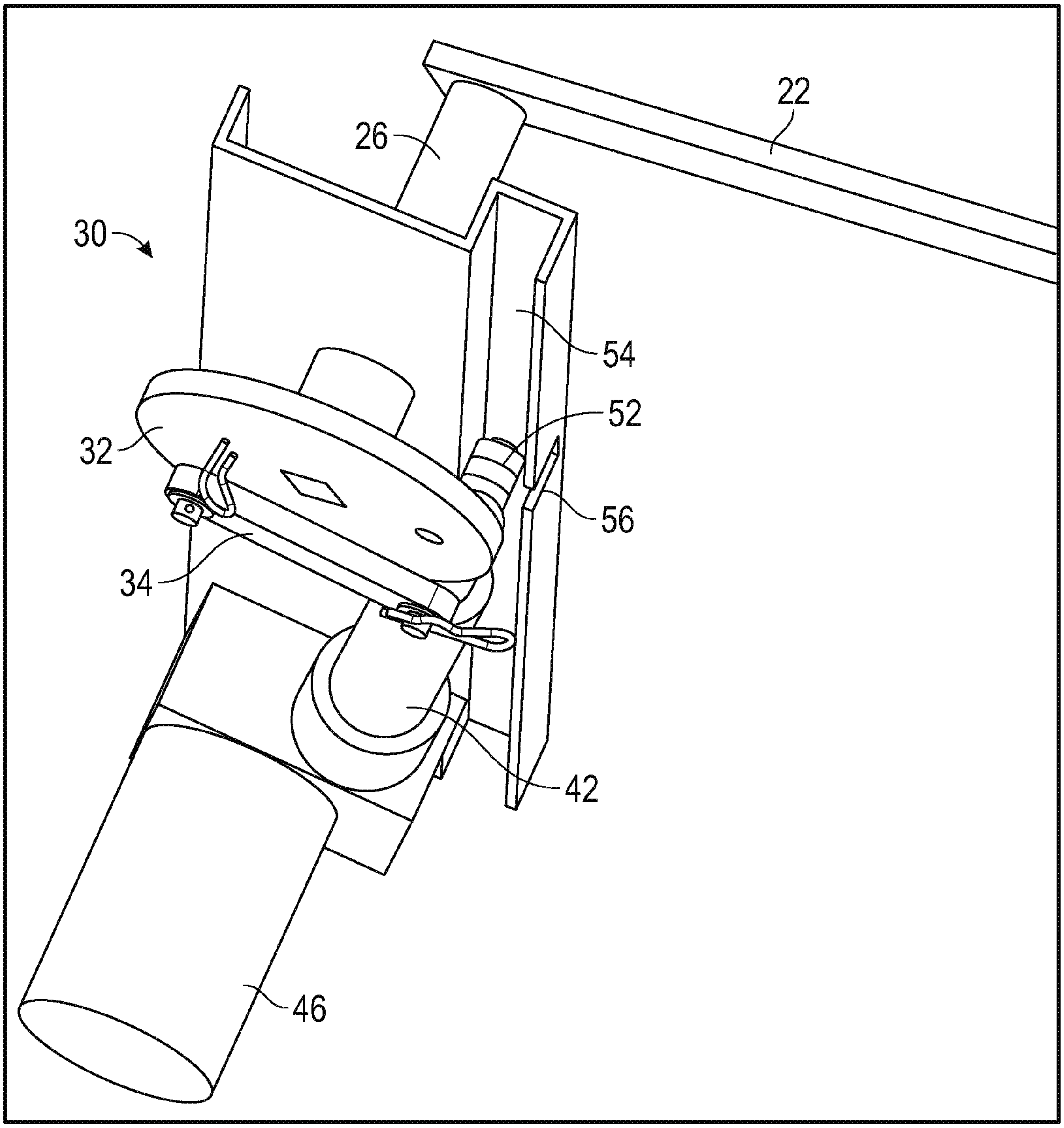

Moving the cover 20 to the covered position in the manual mode of operation is effected simply by rotating the lifter arm 22 back to the closed position, which causes the disk 32, linkage 34 and linear actuator 40 to move back to their respective starting positions/orientations, as best shown in FIG. 29 (ready for manual or motorized opening).

The ability to operate the cover 20 in a manual mode of operation provides an important safety feature in the case that someone is in the spa 10 and the cover 20 is closed, as it allows the cover to be moved to the uncovered position simply by pushing upward on the cover (i.e., it is not locked or held in the closed position by the lift system 30). Moreover, this feature also allows the cover 20 to be opened even when there is no power to run the linear actuator 40. As discussed above, the lift system 30 is thus operable in a manual mode of operation without requiring any special steps to switch between manual and automatic operational modes. In particular, the normal manual uncovering operation (pulling on one of the lifter arms 22, 23) effects decoupling of the linear actuator 40 and switchover to the manual mode without any additional steps.

As alluded to above, the passive lift system 60 on the opposite side of the cover 20 provides lift to the opposite side of the cover so that when the linear actuator 40 is opening or closing the cover, the passive system 60 matches the lift properties so that the cover 20 remains level throughout the opening and closing phases of the cycle. Without such passive system 60, the cover 20 could tilt and cause the bushings and bearings to bind up, jamming the cover 20. The lift systems 30 and 60 thus provide a precision, force balanced cover lift system.

The primary and secondary lift systems 30, 60 of the present invention therefore provide a durable, relatively inexpensive, and mechanically sound means of covering and uncovering a spa in both automatic and manual modes of operation. In particular, the primary lift system 30 utilizes only three main parts, the disk 32, linkage or lever arm 34 and linear actuator 40. While the present invention has been described above as employing an automatic system 30 in combination with a passive system 60 on the opposite side of the cover, it is contemplated that two motor driven lift systems 30 may be employed on either side of the cover. Moreover, while FIG. 1 illustrates cover 20 as a soft cover, the present invention is not intended to be so limited in this regard. In particular, the lift systems 30, 60 of the present invention are intended to be used with both soft and hard covers alike.

While the figures and description discloses that a linear actuator is utilized to automatically move the cover between covered and uncovered positions, the present invention is not intended to be so limited in this regard. In particular, it is contemplated that a variety of motorized lifting mechanisms may be employed or substituted for the linear actuator such as, for example, chain-driven sprockets, direct-drive electric motors, and the like.

Figure 33:
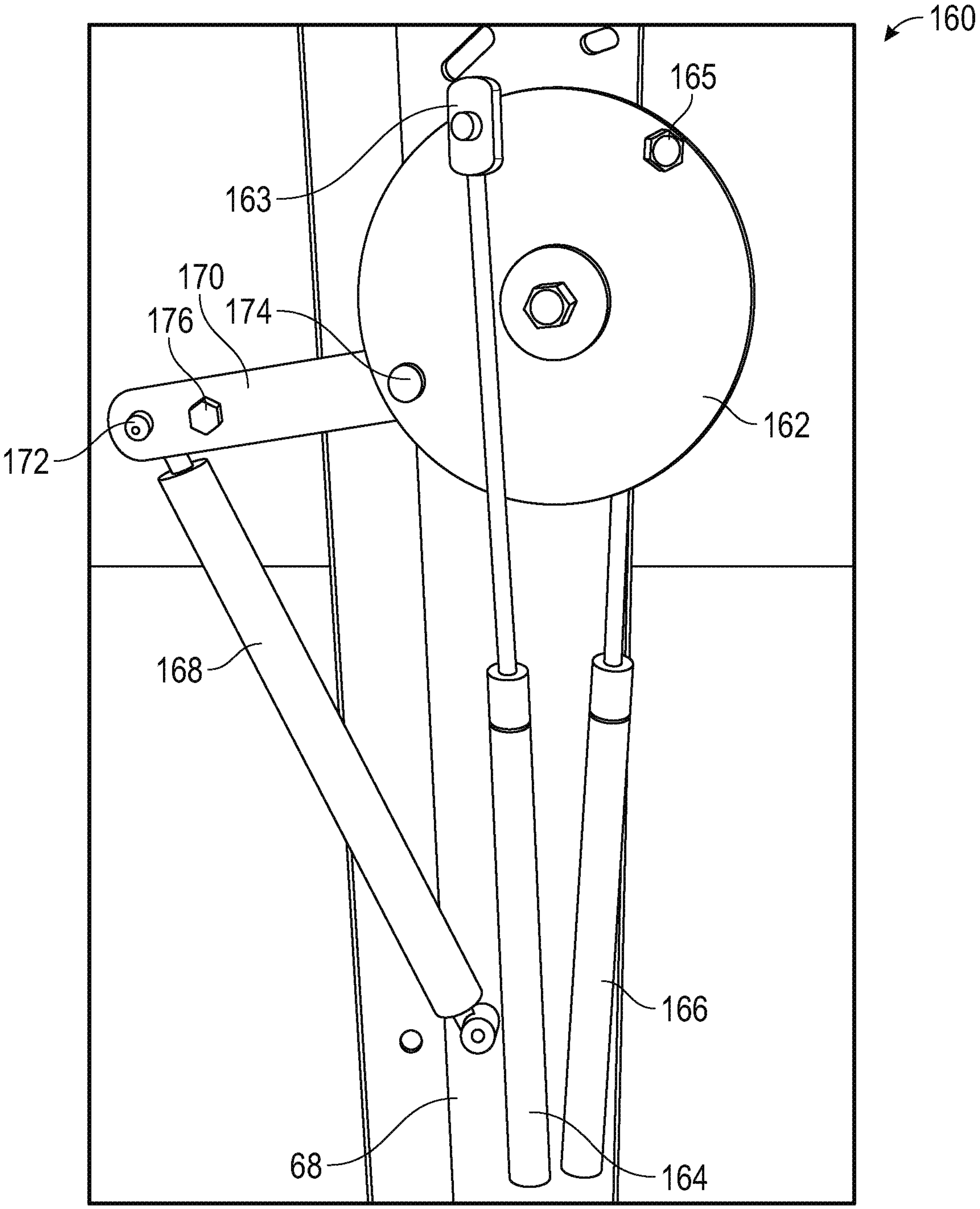
FIG. 33 is a perspective view of a passive lift system according to another embodiment of the present invention.
Figure 34:
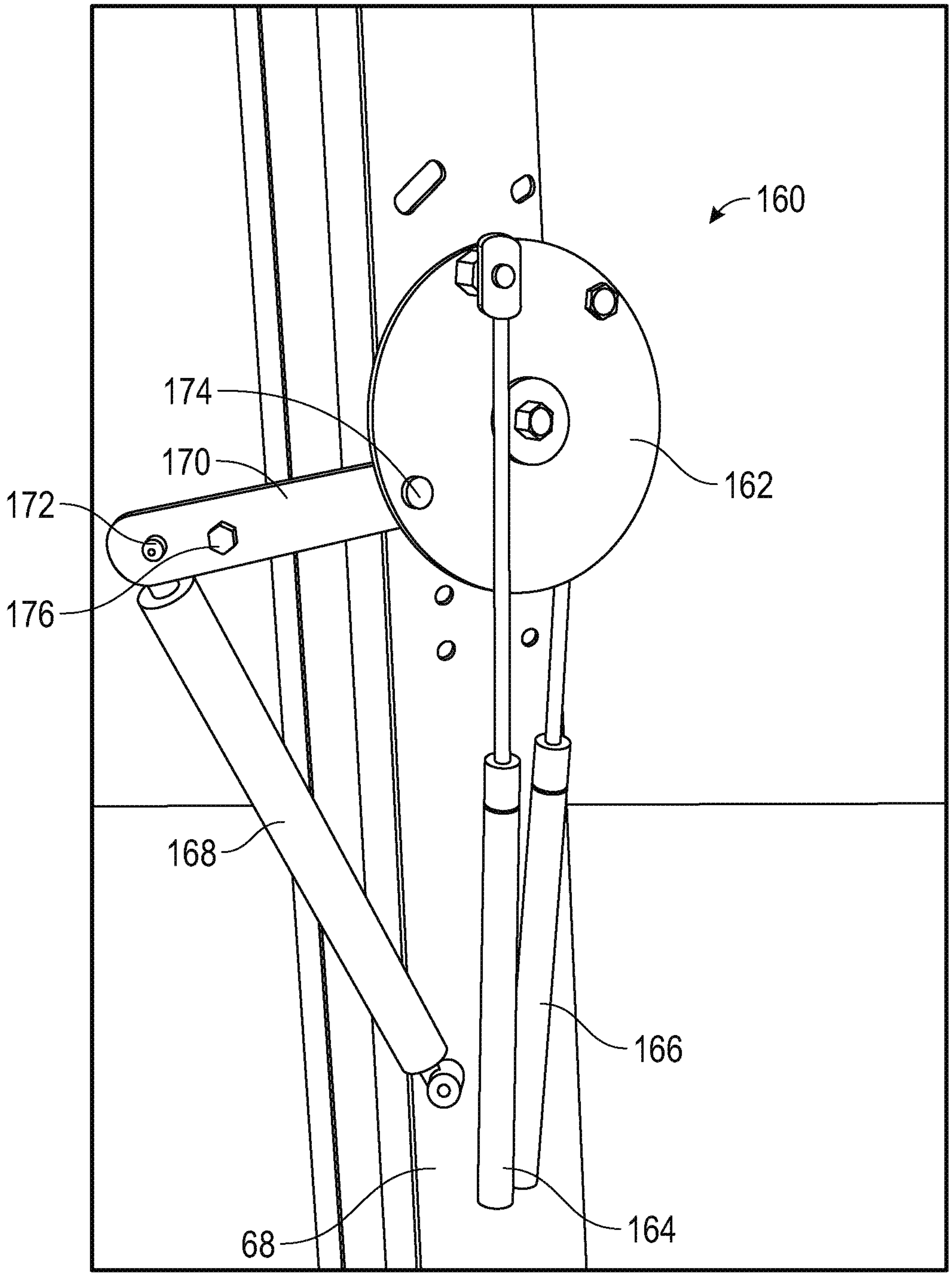
FIG. 34 is another perspective view of the passive list system of FIG. 33.
Figure 35:
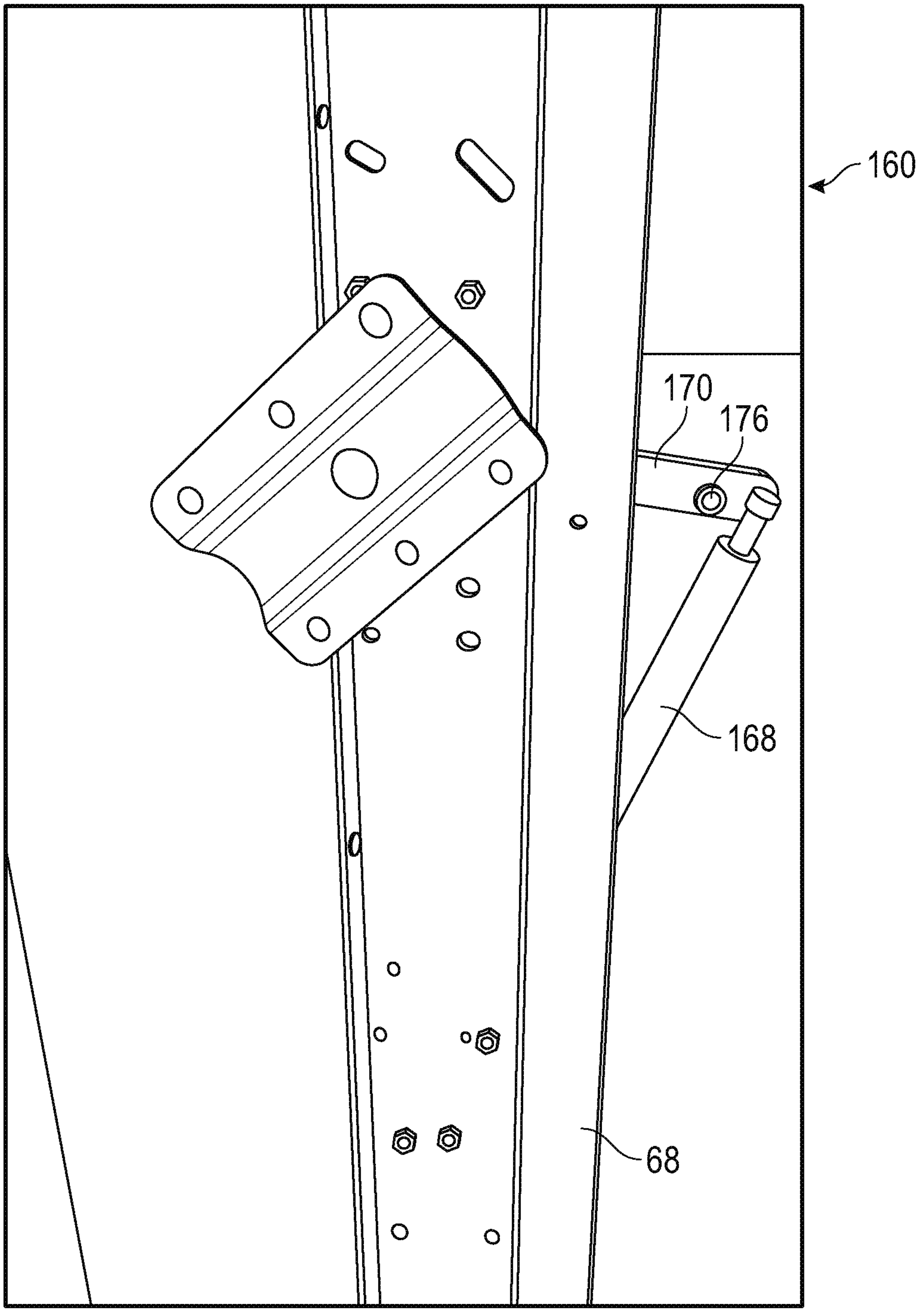
FIG. 35 is another perspective view of the passive list system of FIG. 33, viewed from outside the spa.

Turning finally to FIGS. 33-35 a secondary lift system 160 according to another embodiment of the present invention is illustrated. The secondary lift system 160 may be substituted for lift system 60 in any of the embodiments described above, and is configured to be mounted to a spa opposite the primary lift system 30 to facilitate balancing and smooth movement of the cover between the covered and uncovered positions similar to lift system 60. As shown therein, the secondary lift system 160 includes a plate or disk 162 rigidly connected to the end of the opposing shaft 26 that extends through the side of the housing 12 and which is connected at its opposite end to the opposing lifter arm 23. Plate/disk 162 is configured such that rotation of the lever arms 22, 23 imparts a corresponding rotation of the disk 162, as described above in connection with disk 62. In an embodiment, the axis of rotation of the shaft 26 passes through the center of the plate/disk 162.

The secondary lift assist system 160 includes first and second lift-assist devices 164, 166. The first lift-assist device 164 has a lower end connected to a structural member 68, and an upper end pivotally connected to the plate/disk 162 at a point 163 adjacent to a periphery of the disk (i.e., at a point 163 offset from an axis of rotation of the plate/disk 162). The second lift-assist device 166, likewise, has a lower end connected to the structural member 68, and an upper end pivotally connected to the plate/disk 162 at a point 165 adjacent to a periphery of the disk (i.e., at a point 165 offset from an axis of rotation of the plate/disk 162). In an embodiment, the first lift-assist device 164 is pivotally connected to an inside-facing surface of the disk 162, while the second lift-assist device 166 is pivotally connected to an outside-facing surface of the disk 162.

As further illustrated in FIGS. 33 and 34, the secondary lift assist system 160 further includes a third lift-assist device 168 having a lower end connected to the structural member 68 and an upper and pivotally connected to a first end of a linkage 170 at pivot point 172. A second end of the linkage 170 is pivotally connected to the plate/disk at pivot point 174, which is offset from the axis of rotation of the plate/disk 162. In an embodiment, the lift-assist devices 164, 166, 168 may be configured as mechanical or gas springs, although other types of passive lift-assist devices known in the art may also be utilized. In an embodiment, the third lift-assist device 168 is a traction air/gas spring.

In operation, as the cover opens: the second lift-assist device 166 takes up the load as it rotates to the right and down in FIG. 33, toward the lowered/open position. As it passes its maximum moment applied to the disk 162 and starts to decline as the moment arm from the center of rotation decreases, the first lift-assist device 164 picks up the load of the cover as it rotates further and its moment increases. When first lift-assist device 164 passes its maximum moment, a position stop 176 (e.g., a bolt head/decent) on the lever contacts the disk 162, and the rotation of the disk 162 causes the third lift-assist device 168 to extend, creating a large moment on the disk 162 and handle. This large moment slows down the decent of the "heavy" cover and sets it down gently.

Moreover, during a closing operation, when the cover starts to close, the third lift-assist device 168 provides a substantial torque that aids in lifting the cover from the ground and maintaining it level with the linear actuator driven side (i.e., the primary lift system 30). This prevents tilting and binding of the cover and significantly aids the linear actuator in lifting the cover back onto the spa. Once the cover reaches the position of maximum moment for the middle lift-assist device 164, the bolt head 176 disengages from the disk 162 and the load and moment from the lever falls to zero.

Accordingly, the secondary lift system 160 helps cushion the decent of the cover, and helps lift it back on the spa, and prevents tilting and binding of the cover lift system.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed is:

1. A lift system for a spa cover, comprising:

a first lifter arm connected to a spa cover adjacent to a first end of the first lifter arm, and rotatably connected to a housing of a spa at a second end of the first lifter arm;

a plate connected to the first lifter arm and rotatable with the first lifter arm;

a linkage having a first end connected to the plate adjacent to a periphery of the plate, and a second end; and a linear actuator having a distal end connected to the second end of the linkage, the linear actuator being moveable between a retracted position and an extended position;

wherein movement of the linear actuator from the retracted position to the extended position effects rotation of the plate and the first lifter arm;

wherein the lift system is operable in an automatic mode of operation and a manual mode of operation; and wherein in the manual mode of operation, manually rotating the first lifter arm effects decoupling of the linear actuator from an uncovering and covering cycle of the spa cover.

2. The lift system of claim 1, wherein:

in the automatic mode of operation, the linear actuator is actuatable to move the first lifter arm between a first position where the cover is in a closed position atop the spa, and a second position where the cover is in an uncovered position displaced from atop the spa.

3. The lift system of claim 2, further comprising:

a roller bearing operably connected to the linear actuator, the roller bearing being received in a guide channel in a vertical frame member of the housing.

4. The lift system of claim 3, wherein:

the guide channel includes a clearance opening allowing the roller bearing to exit the guide channel for operation of the lift system in the manual mode of operation.

5. The lift system of claim 2, wherein:

the distal end of the linear actuator is pivotably connected to the second end of the linkage.

6. The lift system of claim 1, wherein:

the first end of the linkage is pivotably connected to the plate.

7. The lift system of claim 1, further comprising:

a second lifter arm connected to the spa cover adjacent to a first end of the second lifter arm, and rotatably connected to the housing at a second end of the second lifter arm;

a second plate connected to the second lifter arm and rotatable with the second lifter arm; and a lift-assist device operatively connected to the second plate and configured to exert a biasing force on the second plate to urge the spa cover towards an uncovered position.

8. The lift system of claim 7, wherein:

the second lifter arm is located on an opposing side of the housing from the first lifter arm.

9. The lift system of claim 7, wherein:

the lift-assist device is one of a mechanical spring or a gas spring.

10. The lift system of claim 1, wherein:

the plate, the linkage and the linear actuator are positioned interior to the housing.

11. A lift system for a spa cover, comprising:

a first lifter arm connected to a spa cover adjacent to a first end of the first lifter arm, and rotatably connected to a housing of a spa at a first pivot point; and a motorized lift device operatively connected to the first lifter arm and configured to move the spa cover between a covered position and an uncovered position; wherein the motorized lift device is a linear actuator; and a roller bearing operably connected to the linear actuator, the roller bearing being received in a guide channel in a vertical frame member of the housing;

wherein the spa cover is moveable between the covered position and the uncovered position automatically under bias from the motorized lift device, and manually via manual rotation of the first lifter arm about the first pivot point.

12. The lift system of claim 11, wherein:

the linear actuator is connected to the first lifter arm via a linkage.

13. The lift system of claim 12, further comprising:

a plate connected to the first lifter arm and rotatable with the first lifter arm;

wherein the linkage interconnects the linear actuator and the plate.

14. The lift system of claim 11, wherein:

the guide channel includes a clearance opening allowing the roller bearing to exit the guide channel for operation of the lift system in a manual mode of operation.

15. The lift system of claim 11, further comprising:

a second lifter arm connected to the spa cover adjacent to a first end of the second lifter arm, and rotatably connected to the housing of a spa at a second pivot point; and a non-motorized lift system operatively connected to the second lifter arm and configured to assist movement of the spa cover between the covered position and the uncovered position.

16. The lift system of claim 15, wherein:

the non-motorized lift system includes a plate operatively connected to the second lifter arm and rotatable about the second pivot point, a first gas spring pivotally connected to the plate at a point offset from the second pivot point, and a second gas spring pivotally connected to the plate at a point offset from the second pivot point.

17. A lift system for a spa cover, comprising:

a first lifter arm connected to a spa cover adjacent to a first end of the first lifter arm, and rotatably connected to a housing of a spa at a first pivot point;

a motorized lift device operatively connected to the first lifter arm and configured to move the spa cover between a covered position and an uncovered position;

a second lifter arm connected to the spa cover adjacent to a first end of the second lifter arm, and rotatably connected to the housing of a spa at a second pivot point; and a non-motorized lift system operatively connected to the first lifter arm and configured to assist movement of the spa cover between the covered position and the uncovered position;

wherein the spa cover is moveable between the covered position and the uncovered position automatically under bias from the motorized lift device, and manually via manual rotation of the first lifter arm about the first pivot point;

wherein the non-motorized lift system includes a plate operatively connected to the second lifter arm and rotatable about the second pivot point, a first gas spring pivotally connected to the plate at a point offset from the second pivot point, and a second gas spring pivotally connected to the plate at a point offset from the second pivot point; and wherein the non-motorized lift system further includes a third gas spring and a linkage, a first end of the linkage being pivotally connected to the plate at a point offset from the second pivot point, and a second end of the linkage being pivotally connected to the third gas spring.

18. The lift system of claim 17, wherein:

the linkage includes a position stop configured to contact an edge of the plate during rotation of the plate about the second pivot point.

* * * * *